(12) United States Patent
Ohno et al.

(10) Patent No.: US 9,519,655 B2
(45) Date of Patent: Dec. 13, 2016

(54) FILE SYNCHRONIZATION METHOD AND FILE SYNCHRONIZATION SERVER APPARATUS

(75) Inventors: Takashi Ohno, Kobe (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 458 days.

(21) Appl. No.: 13/561,691

(22) Filed: Jul. 30, 2012

(65) Prior Publication Data

US 2013/0054519 A1 Feb. 28, 2013

(30) Foreign Application Priority Data

Aug. 31, 2011 (JP) .................................. 2011-188328

(51) Int. Cl.
| | | |
|---|---|---|
| *G06F 7/00* | (2006.01) | |
| *G06F 17/00* | (2006.01) | |
| *G06F 17/30* | (2006.01) | |
| *H04L 29/08* | (2006.01) | |
| *G06F 15/16* | (2006.01) | |
| *G06F 15/173* | (2006.01) | |

(52) U.S. Cl.
CPC ..... *G06F 17/30179* (2013.01); *H04L 67/2823* (2013.01)

(58) Field of Classification Search
None
See application file for complete search history.

(56) References Cited

U.S. PATENT DOCUMENTS

| | | | |
|---|---|---|---|
| 6,324,544 B1 * | 11/2001 | Alam et al. ................... | 707/201 |
| 6,477,543 B1 | 11/2002 | Huang et al. | |
| 7,636,792 B1 * | 12/2009 | Ho ............................... | 709/246 |
| 2003/0217057 A1 * | 11/2003 | Kuroiwa et al. ................ | 707/7 |
| 2006/0123064 A1 * | 6/2006 | Kim et al. ..................... | 707/201 |
| 2009/0249204 A1 | 10/2009 | Sugiura | |

FOREIGN PATENT DOCUMENTS

| | | |
|---|---|---|
| JP | 2000-132444 | 5/2000 |
| JP | 2001-297073 | 10/2001 |
| JP | 2006-331273 | 12/2006 |
| JP | 2006-343830 | 12/2006 |
| JP | 2009-237843 | 10/2009 |
| JP | 2010-128776 | 6/2010 |
| WO | WO 2010/0148093 | 12/2010 |

OTHER PUBLICATIONS

Japanese Notification of Reasons for Refusal dated Nov. 25, 2014 in Japanese Application No. 2011-188328.
Japanese Office Action mailed Mar. 31, 2015 in related Japanese Application No. 2011-188328.

* cited by examiner

*Primary Examiner* — James Trujillo
*Assistant Examiner* — Cheryl M Shechtman
(74) *Attorney, Agent, or Firm* — Staas & Halsey LLP

(57) ABSTRACT

A file synchronization method includes determining whether a terminal apparatus is capable of receiving a file in response to a synchronization request for the file, and converting the file into a format usable by the terminal apparatus, when that the terminal apparatus is capable of receiving the file is determined by the determining.

13 Claims, 19 Drawing Sheets

FIG. 4

|  | 21A | 21B | 21C | 21D |
|---|---|---|---|---|
|  | FILE ID | FILE CONTENTS | FORMAT ID | TERMINAL ID |
|  | F11 | XXX | Ppt | T11, T12··· |
|  | F12 | YYY | Ppt | T11, T12··· |
|  | ... | ... | ... | ... |

| THUMBNAIL ID | THUMBNAIL IMAGE | FILE ID |
|---|---|---|
| Sam01 | SSS | F11 |
| ... | ... | ... |

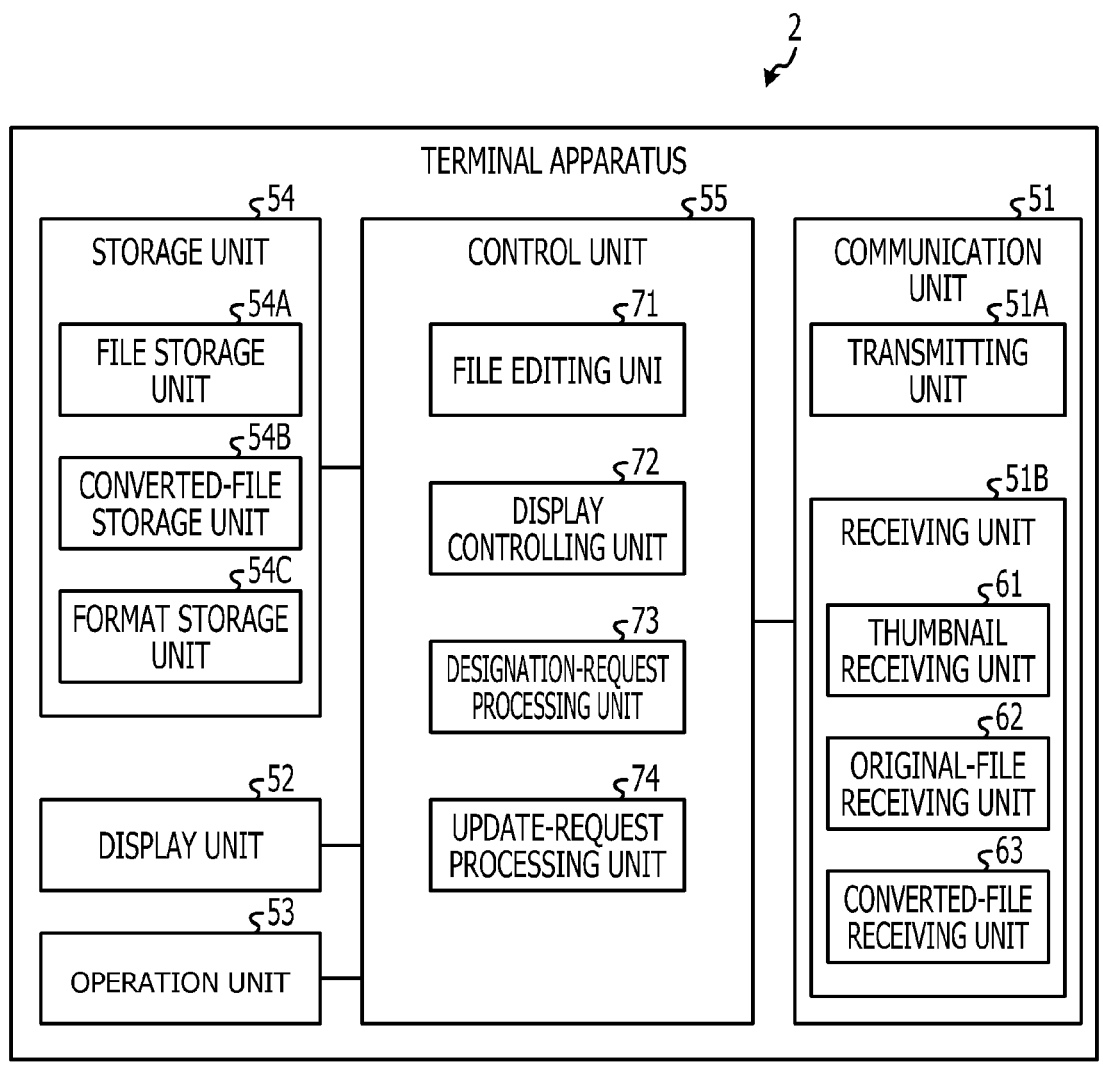

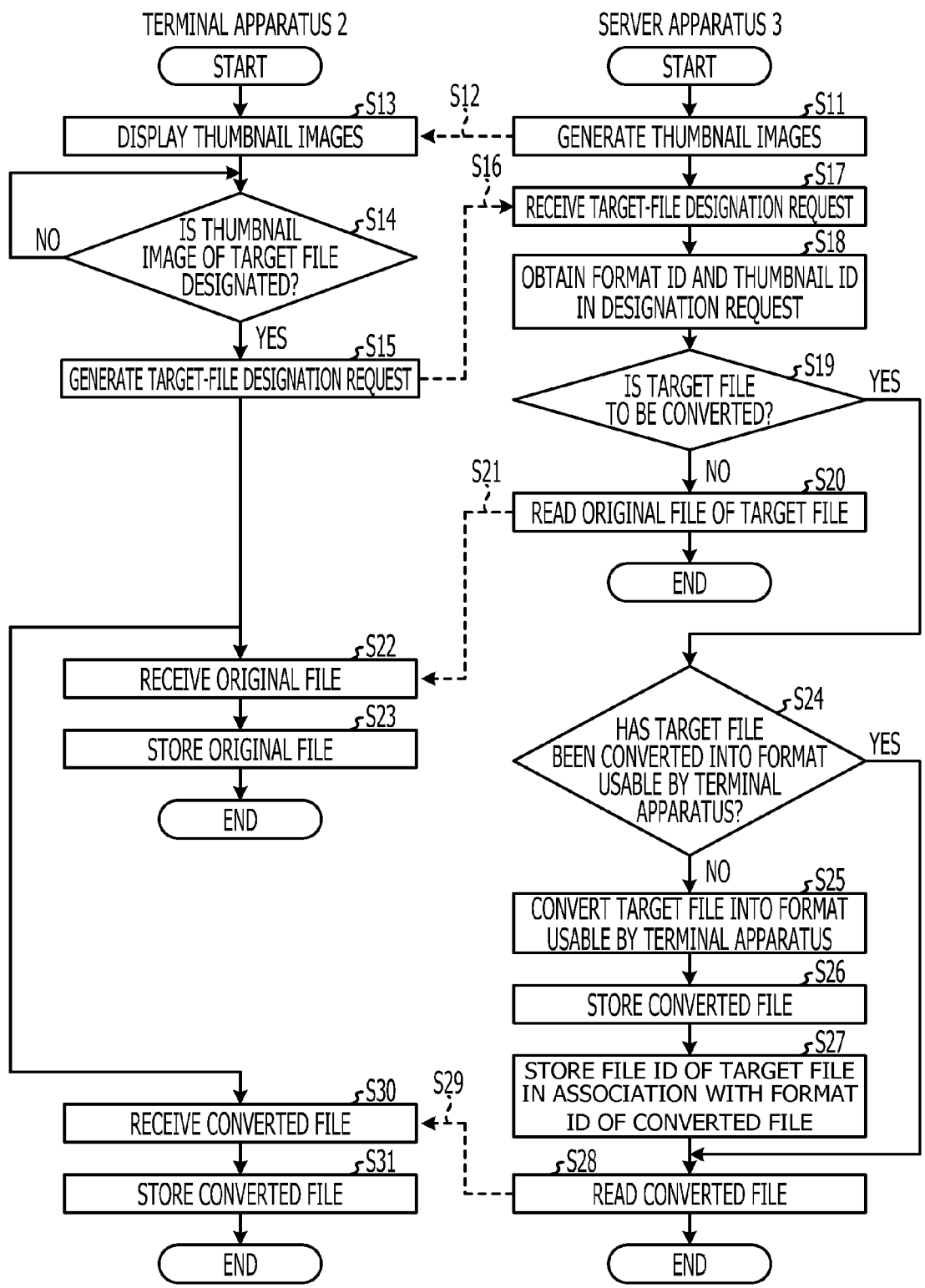

FIG. 15

| FILE ID | FILE CONTENTS | FORMAT ID | USER ID | TERMINAL ID |
|---|---|---|---|---|
| F11 | XXX | Ppt | U11, U12··· | T21, T22, T31, T32··· |
| F12 | YYY | Ppt | U11, U12··· | T21, T22, T31, T32··· |
| ··· | ··· | ··· | ··· | ··· |

26A 26B 26C 26D 26E / 26

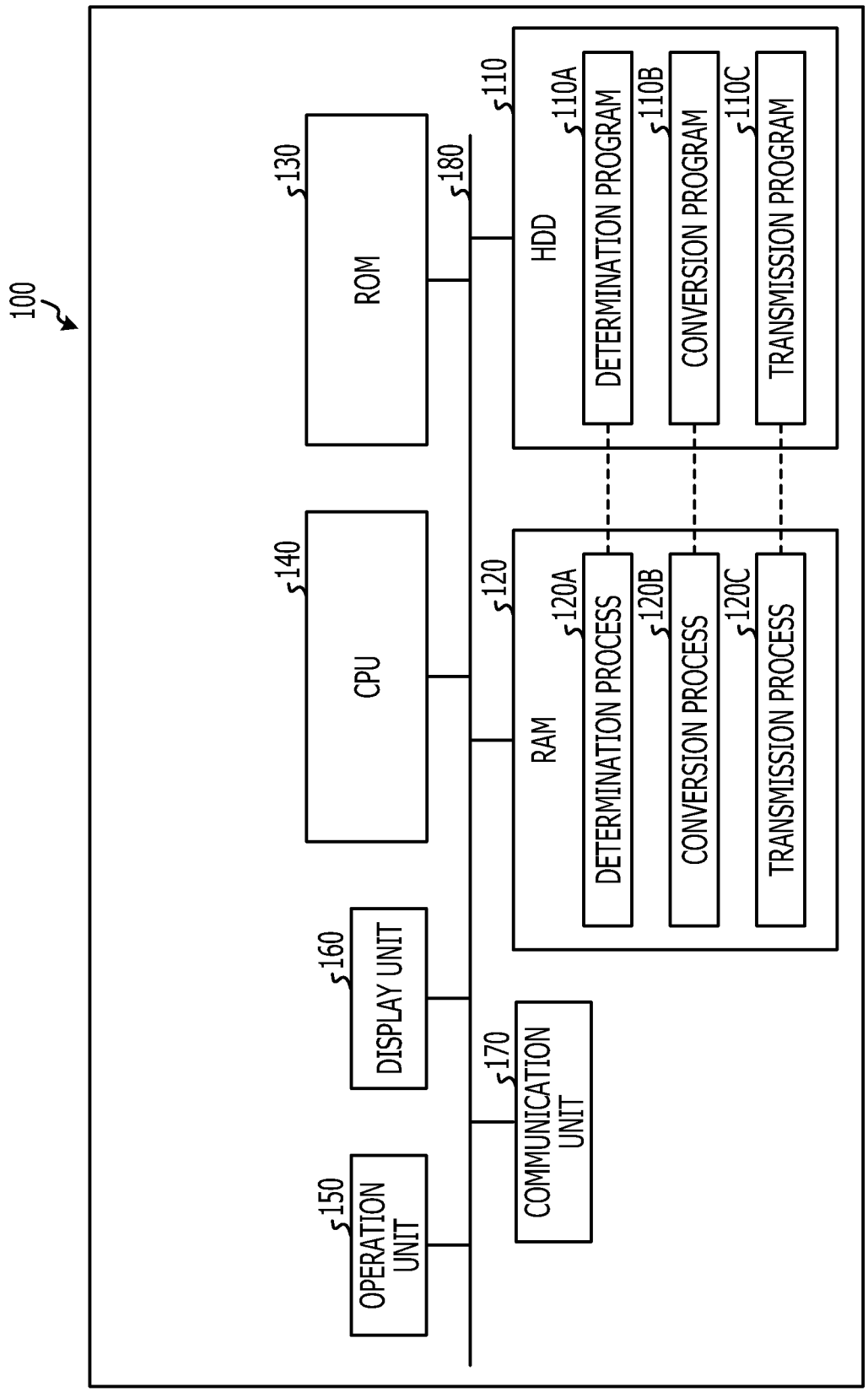

FILE SYNCHRONIZATION METHOD AND FILE SYNCHRONIZATION SERVER APPARATUS

CROSS-REFERENCE TO RELATED APPLICATION

This application is based upon and claims the benefit of priority of the prior Japanese Patent Application No. 2011-188328, filed on Aug. 31, 2011, the entire contents of which are incorporated herein by reference.

FIELD

The embodiments discussed herein are related to a file synchronization method and a file synchronization server apparatus.

BACKGROUND

For example, terminal apparatuses, such as smart phones and personal computers, are used to edit files. The edited files are transmitted through a network and are stored in a server apparatus. A file sharing system in which multiple terminal apparatuses share the stored files has been widely used.

In the file sharing system, since the server apparatus manages the files, it is easy to synchronize the files between the terminal apparatuses. In the file sharing system, for example, in intranets, personal computers (hereinafter after referred to as "PCs") are typically used to edit the files. In the file sharing system, for example, in environments other than intranets, smart phones and so on are typically used to view the files. The file sharing system allows for editing and viewing, wherever the terminal apparatuses are used. A description below will be given of a file synchronization system that provides a file sharing service.

FIG. 1 illustrates one example of a file synchronization system. A file synchronization system 200 illustrated in FIG. 1 includes multiple terminal apparatuses 210 and a server apparatus 220. Each terminal apparatus 210 couples to the server apparatus 220 through a network 230 to obtain a shared file from the server apparatus 220. For example, the terminal apparatus 210 obtains thumbnail images 240 of files obtainable from the server apparatus 220. The obtained thumbnail images 240 are displayed on a screen. A user of the terminal apparatus 210 designates, of the thumbnail images 240 displayed on the screen, the thumbnail image 240 of a desired one of the files, and the terminal apparatus 210 receives the designation of the thumbnail image 240.

The server apparatus 220 converts the file corresponding to the thumbnail image 240, designated in response to the thumbnail image 240 designation operation performed with the terminal apparatus 210, into a format usable by the terminal apparatus 210. The server apparatus 220 transmits the converted file to the terminal apparatus 210. The terminal apparatus 210 receives the converted file, so that the received file is edited.

In the file synchronization system 200, when the file is edited with the terminal apparatus 210 and then the edited file is stored in the server apparatus 220, the edited file is synchronized between the terminal apparatuses 210 that share the edited file.

For example, when file formats used by the terminal apparatuses 210 are different from each other, the server apparatus 220 converts a file into a format suitable for the corresponding one of the terminal apparatuses 210. The converted file is then transmitted to the corresponding terminal apparatus 210. Thus, the file is viewed and edited with each terminal apparatus 210.

For example, for synchronization of an update file between the terminal apparatuses 210, the server apparatus 220 converts the update file into a format usable by each terminal apparatuses 210. Consequently, the amount of processing load for the file synchronization between the terminal apparatuses 210 is temporarily concentrated.

Examples of related art include Japanese Laid-open Patent Publication Nos. 2006-343830, 2001-297073, 2000-132444, 2006-331273, and 2010-128776.

SUMMARY

According to an aspect of the embodiments, a file synchronization method includes determining whether a terminal apparatus is capable of receiving a file in response to a synchronization request for the file, and converting the file into a format usable by the terminal apparatus, when that the terminal apparatus is capable of receiving the file is determined by the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates one example of a table structure of a file database;

FIG. 5 illustrates one example of a table structure of a thumbnail database;

FIG. 8 illustrates one example of a terminal apparatus according to the first embodiment;

FIG. 10 illustrates one example of processing operations performed by the server apparatus and the terminal apparatus with respect to file synchronization processing;

FIG. 15 illustrates one example of a table structure of a file database;

FIG. 19 illustrates a computer for executing a file synchronization program.

DESCRIPTION OF EMBODIMENTS

A file synchronization method, a file synchronization server apparatus, and a file synchronization program according to embodiments will be described below in detail with reference to the accompanying drawings. It is, however, to be noted that the technology disclosed herein is not limited by the embodiments. The embodiments disclosed herein may be combined as appropriate.

Figure 1:
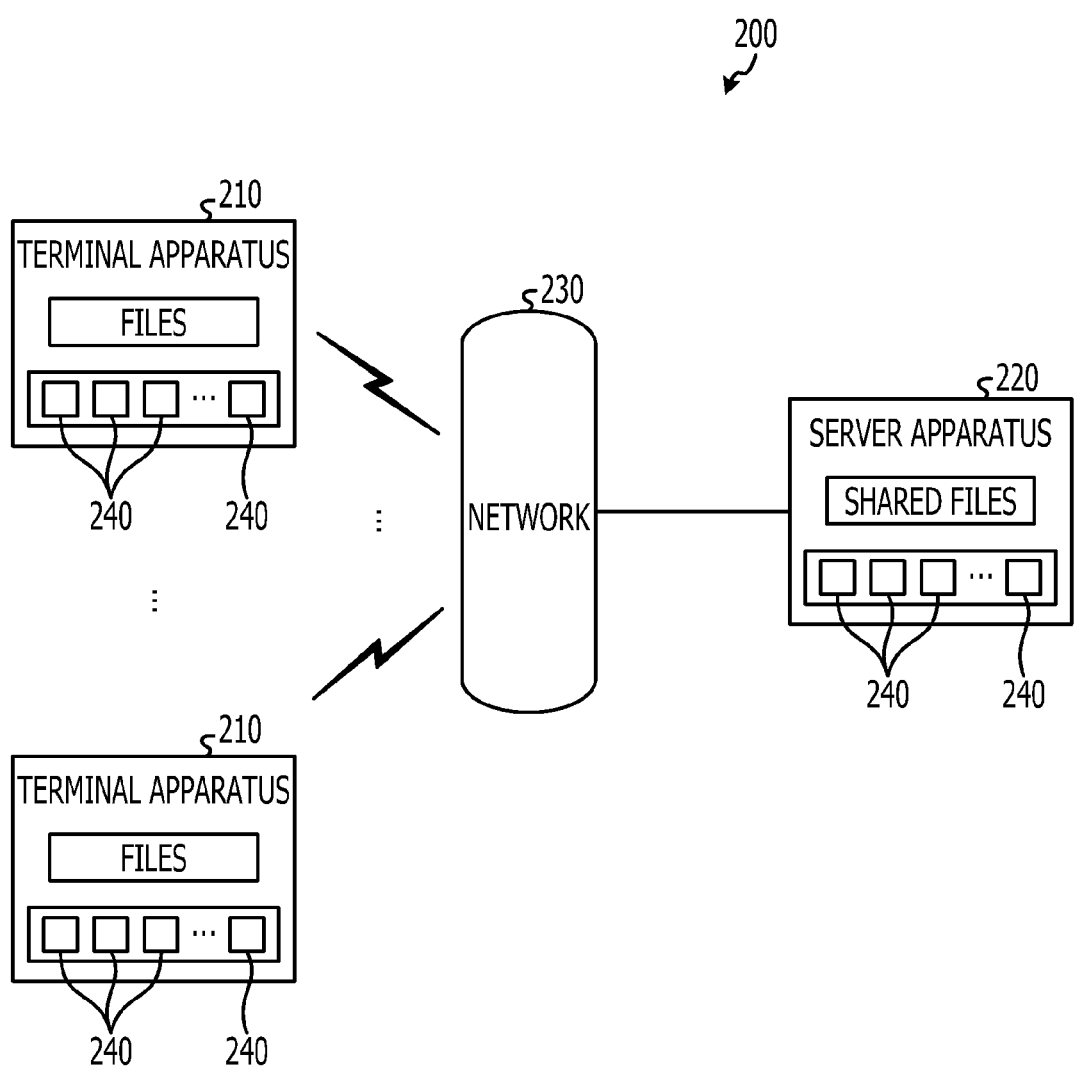
FIG. 1 illustrates one example of a file synchronization system.
Figure 2:
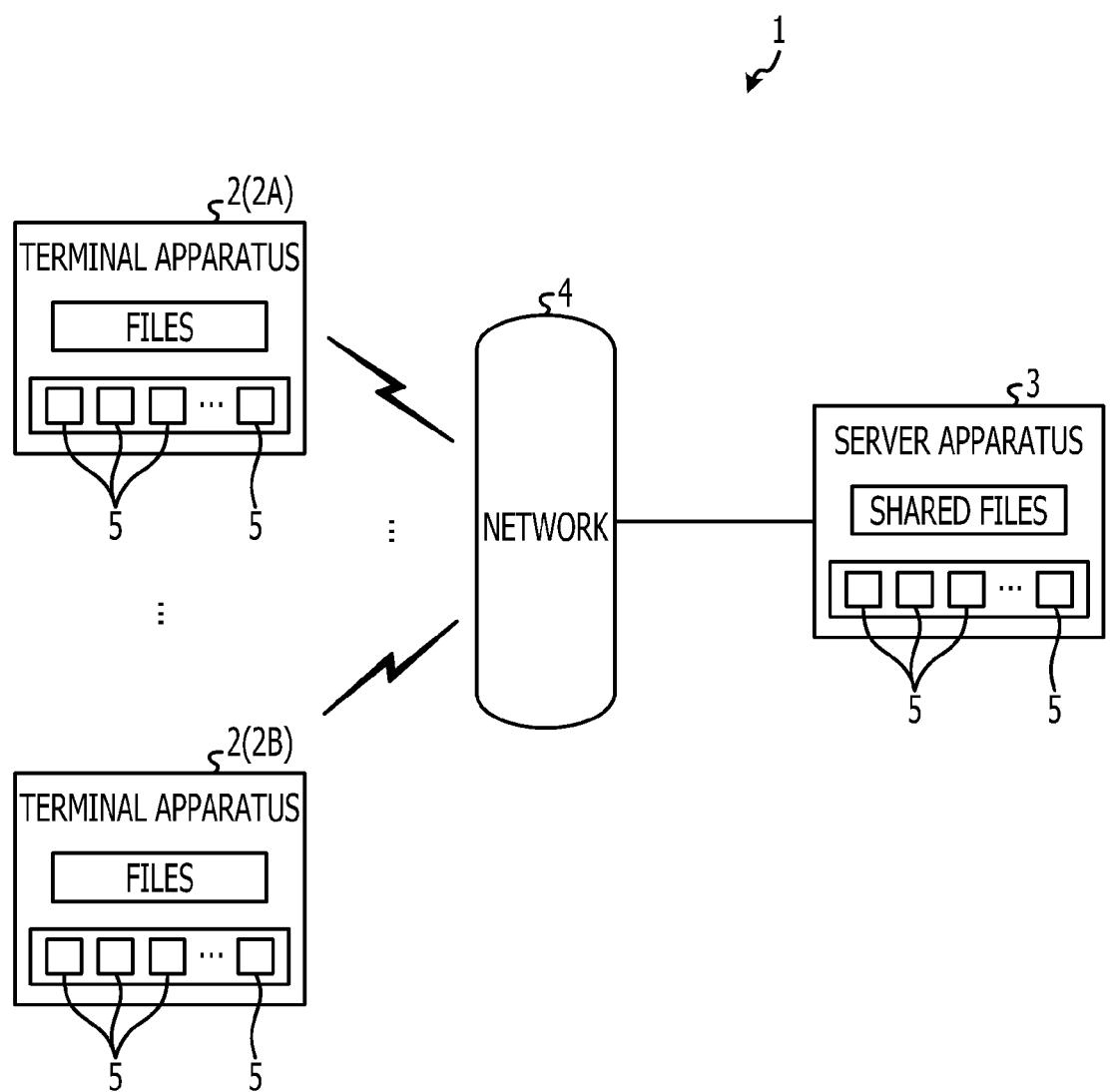
FIG. 2 illustrates one example of a file synchronization system according to a first embodiment.

FIG. 2 illustrates one example of a file synchronization system according to a first embodiment. A file synchronization system 1 illustrated in FIG. 2 includes multiple terminal apparatuses 2 and a server apparatus 3. In the file synchronization system 1, the terminal apparatuses 2 share files, stored in the server apparatus 3, through a network 4. The terminal apparatus 2 has a function for editing a file in a usable format and is implemented by, for example, an information terminal equipped with a communication function. Examples of the information terminal include a smart phone, a mobile terminal, and a PC. The format is, for example, a format for a program for an application, such as file editing or file viewing executed at each information terminal. That is, the format represents a data format that enables reading and writing of each program. The server apparatus 3 stores, for example, files or the like edited by the terminal apparatuses 2, as shared files.

The server apparatus 3 generates thumbnail images 5 of the shared files stored in the corresponding formats and transmits the thumbnail images 5 to the corresponding terminal apparatuses 2 through the network 4. Upon receiving the thumbnail images 5, the terminal apparatus 2 displays the thumbnail images 5 on a screen of a display unit. A user of the terminal apparatus 2 recognizes the shared files by referring to the thumbnail images 5 displayed on the screen and designates, of the thumbnail images 5, the thumbnail image 5 corresponding to a desired one of the files. When the thumbnail image 5 is designated with the terminal apparatus 2, the server apparatus 3 reads the file corresponding to the designated thumbnail images 5 and converts the read file into a format usable by the terminal apparatus 2. After converting the file into the usable format, the server apparatus 3 transmits the converted file to the terminal apparatus 2 through the network 4.

When the file is edited with any one of the terminal apparatuses 2 and the edited file is stored in the server apparatus 3 as a shared file, the server apparatus 3 causes the terminal apparatuses 2 that share the file to synchronize the file therebetween. As a result, the server apparatus 3 causes the latest file to be shared between the terminal apparatuses 2.

Figure 3:
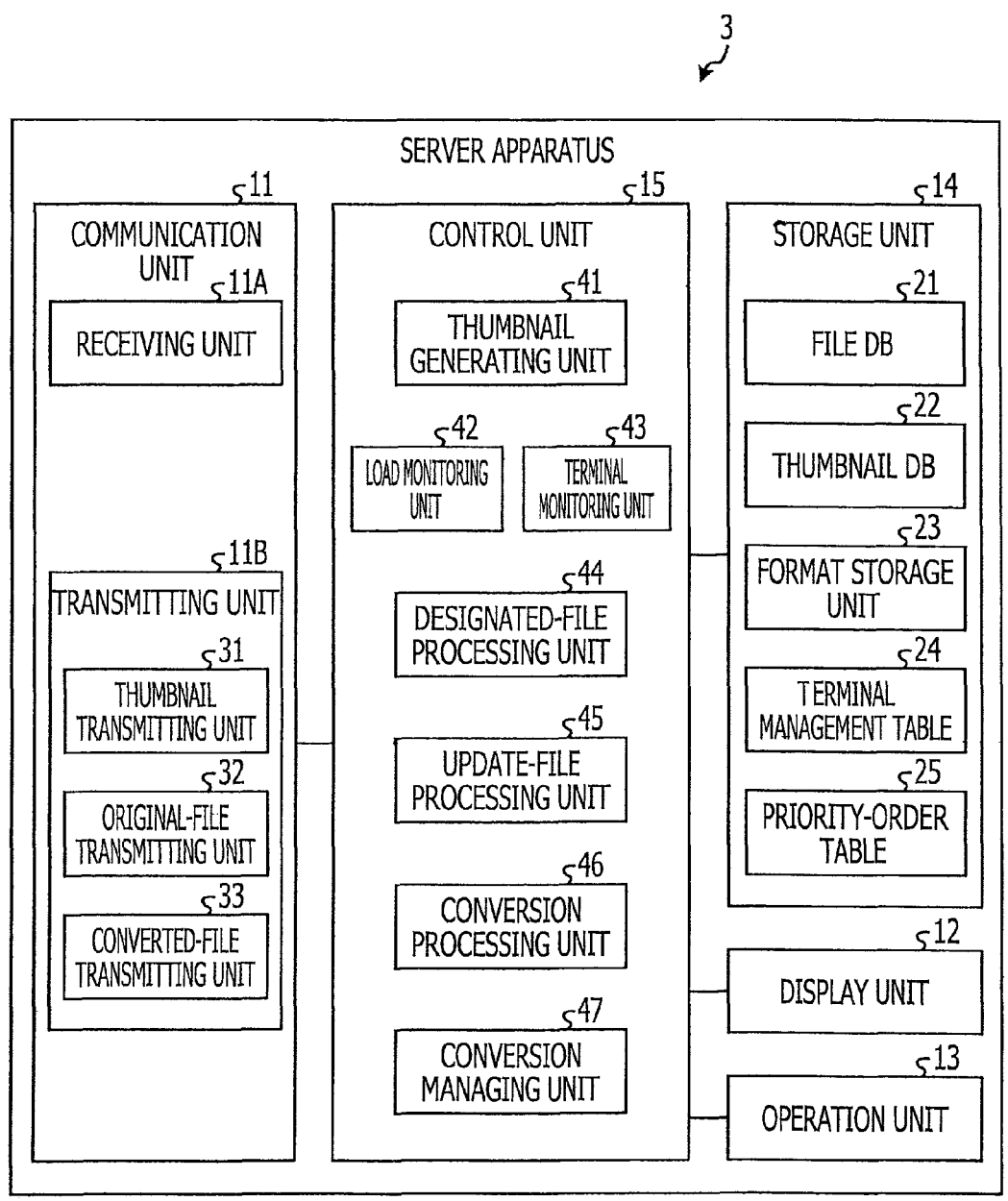
FIG. 3 illustrates one example of a server apparatus according to the first embodiment.

FIG. 3 illustrates one example of the server apparatus 3 according to the first embodiment. The server apparatus 3 illustrated in FIG. 3 includes a communication unit 11, a display unit 12, an operation unit 13, a storage unit 14, and a control unit 15. The storage unit 14 includes a file database (hereinafter referred to as a "file DB") 21, a thumbnail database (hereinafter referred to as a "thumbnail DB") 22, a format storage unit 23, a terminal management table 24, and a priority-order table 25. Examples of the storage unit 14 include a HDD (hard disk drive), a RAM (random access memory), and a ROM (read only memory).

FIG. 4 illustrates one example of a table structure of the file DB 21. The file DB 21 illustrated in FIG. 4 stores therein file IDs 21A, file contents 21B, format IDs 21C, and terminal IDs 21D in association with each other. The file ID 21A is an ID for identifying a corresponding file. The file contents 21B represent file data. The format ID 21C is an ID for identifying the format of the file. The terminal IDs 21D are IDs for identifying the terminal apparatuses 2 that share the file. The control unit 15 refers to the file DB 21, and for example, when the file ID 21A is "F11", the control unit 15 recognizes that the file contents 21B are "XXX", the format ID 21C is "Ppt", and the terminal IDs 21D are "T11, T12, . . . ".

FIG. 5 illustrates one example of a table structure of the thumbnail DB 22. The thumbnail DB 22 illustrated in FIG. 5 stores therein thumbnail IDs 22A, thumbnail images 22B, and file IDs 22C in association with each other. The thumbnail ID 22A is an ID for identifying the thumbnail image 5 of a file. The thumbnail image 22B is data of the thumbnail image 5. The file ID 22C is an ID for identifying a file corresponding to the thumbnail image 5. The control unit 15 refers to the thumbnail DB 22, and for example, when the thumbnail ID 22A is "Sam01", the control unit 15 recognizes that the thumbnail image 22B is "SSS" and the file ID 22C is "F11".

The format storage unit 23 stores formats usable by the corresponding terminal apparatuses 2. The formats correspond to, for example, the formats of applications for editing files usable by the corresponding terminal apparatuses 2.

Figure 6:
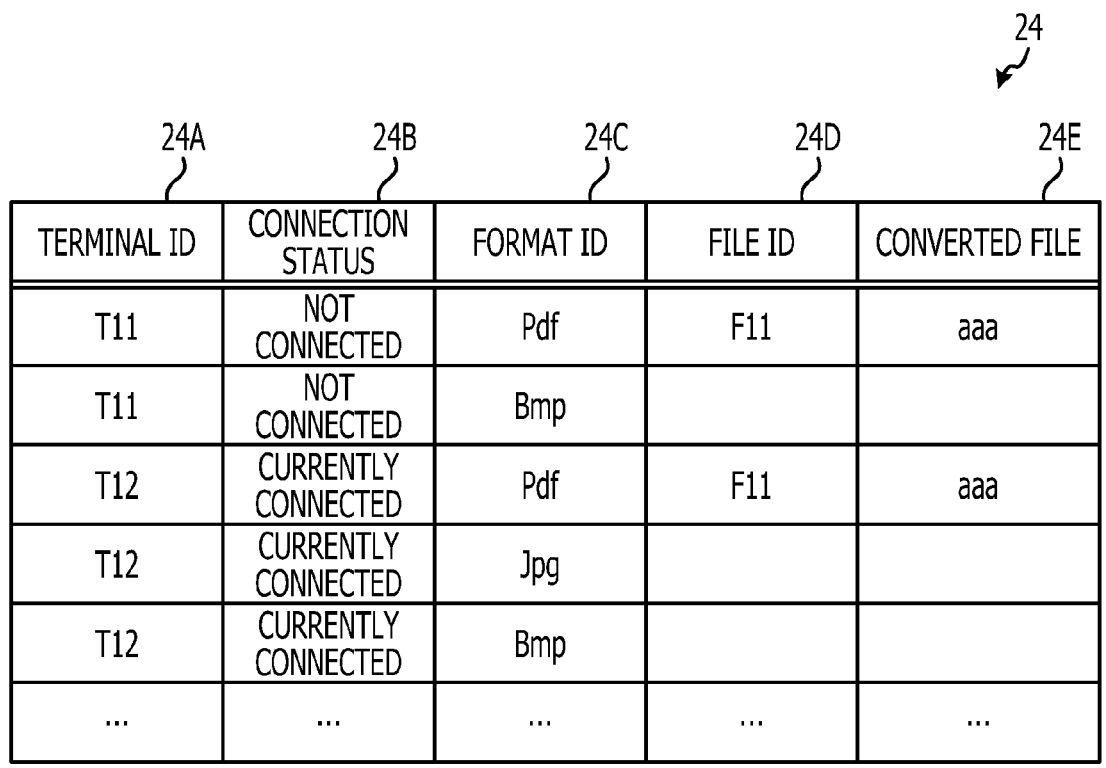
FIG. 6 illustrates one example of a table structure of a terminal management table.

FIG. 6 illustrates one example of a table structure of the terminal management table 24. The terminal management table 24 illustrated in FIG. 6 contains terminal IDs 24A, connection statuses 24B, format IDs 24C, file IDs 24D, and converted files 24E in association with each other. The terminal ID 24A is an ID for identifying the terminal apparatus 2. The connection status 24B represents a state of communication with the terminal apparatus 2. Examples of the state of communication include, for example, a "currently coupled" state in which a file is receivable and a "not coupled" state in which no file is receivable. The format ID 24C is an ID for identifying a file format usable by the corresponding terminal apparatus 2. The file ID 24D is an ID for identifying, when a converted file for the terminal apparatus 2 is available, the original file of the converted file. By referring to the file ID 24D, the control unit 15 determines whether or not the file has been converted. The converted file 24E indicates the contents of a converted file. For example, when referring to the terminal ID 24A "T12" in the terminal management table 24, the control unit 15 recognizes that the connection status 24B is "currently coupled" and the format IDs 24C are "Pdf", "Jpg", and "Bmp". For example, for a file converted in a Pdf format, the control unit 15 recognizes that the file ID 24D of the file is "F11" and the converted file 24E is "aaa".

Figure 7:
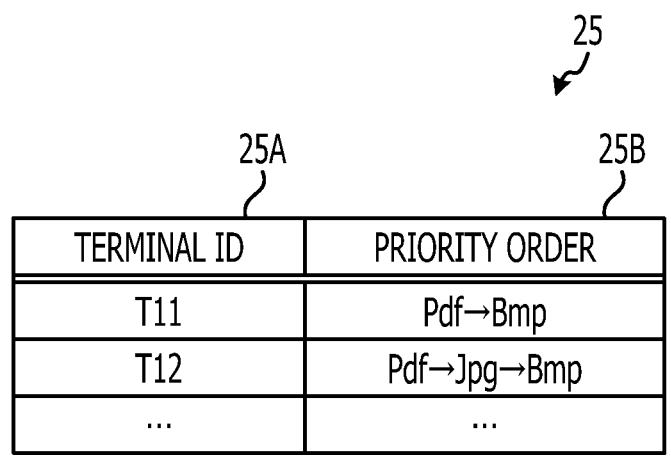
FIG. 7 illustrates one example of a table structure of a priority-order table.

FIG. 7 illustrates one example of a table structure of the priority-order table 25. The priority-order table 25 illustrated in FIG. 7 contains terminal IDs 25A and priorities 25B in association with each other. The terminal ID 25A is an ID for identifying the terminal apparatus 2. The priority order 25B represents priorities of formats usable by the corresponding terminal apparatus 2. When referring to the terminal ID 25A "T12", the control unit 15 recognizes that "Pdf" is used with first priority of the priority order 25B for the corresponding terminal apparatus 2, "Jpg" is used with second priority, and "Bmp" is used with third priority.

The communication unit 11 illustrated in FIG. 3 communicates with the multiple terminal apparatuses 2 through the network 4. The communication unit 11 includes a receiving unit 11A and a transmitting unit 11B. The receiving unit 11A receives, for example, an update request for an original file modification due to file editing at the terminal apparatus 2 and a target-file designation request due to thumbnail image 5 designation performed at the terminal apparatus 2.

The transmitting unit 11B includes a thumbnail transmitting unit 31, an original-file transmitting unit 32, and a converted-file transmitting unit 33. The thumbnail transmitting unit 31 transmits the thumbnail images 5, stored in the thumbnail DB 22, to the terminal apparatus 2. The original-file transmitting unit 32 reads the file stored in the file DB 21 and transmits the file in its original format to the terminal apparatus 2. The converted-file transmitting unit 33 reads one of the files stored in the file DB 21, converts the read file into the format usable by the corresponding terminal apparatus 2, and transmits the converted file to the terminal apparatus 2.

The control unit 15 includes a thumbnail generating unit 41, a load monitoring unit 42, a terminal monitoring unit 43, a designated-file processing unit 44, an update-file processing unit 45, a conversion processing unit 46, and a conversion managing unit 47. The control unit 15 is implemented by, for example, a CPU (central processing unit). The thumbnail generating unit 41 generates thumbnail images 5 of the original files stored in the file DB 21. Upon generating the thumbnail images 5, the thumbnail generating unit 41 associates the thumbnail IDs 22A, the thumbnail images 22B, and the file IDs 22C of the generated thumbnail images 5 with each other to thereby update the thumbnail DB 22.

The load monitoring unit 42 monitors an amount of load of the entire server apparatus 3. The load monitoring unit 42 determines the amount of load of the server apparatus 3 on the basis of the communication status of the communication unit 11 in the server apparatus 3, the amount of usage of the storage unit 14, and the processing status of the control unit 15. The terminal monitoring unit 43 monitors a status of connection with each terminal apparatus 2. Examples of the status of communication include, with respect to a communication connection with the terminal apparatus 2, a "currently coupled" communication state in which the terminal apparatus 2 is capable of receiving a to-be-updated file from the server apparatus 3 and a "not coupled" communication state in which the terminal apparatus 2 is not capable of receiving a to-be-updated file from the server apparatus 3. The control unit 15 updates the terminal management table 24 on the basis of a result of monitoring performed by the terminal monitoring unit 43.

In response to a designation request from the terminal apparatus 2, the designated-file processing unit 44 obtains the file ID in the designation request and reads, from the file DB 21, the file corresponding to the obtained file ID. The designation request includes the file ID for the file corresponding to the thumbnail image 5 designated with the terminal apparatus 2 and the format ID for identifying the format usable by the terminal apparatus 2. The designated-file processing unit 44 obtains, from the file DB 21, the format ID for the target file corresponding to the designation request and compares the obtained format ID with the format ID usable by the terminal apparatus 2 that transmitted the designation request. When those format IDs are different from each other, the designated-file processing unit 44 determines that the target file is to be converted into the format usable by the terminal apparatus 2. Thus, the designated-file processing unit 44 reads the target file from the file DB 21 and instructs the conversion processing unit 46 so as to convert the read target file into the format usable by the terminal apparatus 2.

When those format IDs are identical, the designated-file processing unit 44 determines that the target file is not to be converted into the format usable by the terminal apparatus 2. Thus, the designated-file processing unit 44 reads the target file from the file DB 21 and instructs the original-file transmitting unit 32 so as to transmit the read target file in its original format to the terminal apparatus 2.

In response to the file-update request from the terminal apparatus 2, the update-file processing unit 45 obtains the terminal ID 21D from the file DB 21 by using the file ID of the to-be-updated file corresponding to the update request. By referring to the connection status 24B corresponding to the terminal ID 21D in the terminal management table 24, the update-file processing unit 45 identifies the terminal apparatus 2 whose connection status 24B indicates "currently coupled". Upon identifying the "currently coupled" terminal apparatus 2, the update-file processing unit 45 refers to the terminal management table 24 to compare the format ID 24C usable by the terminal apparatus 2 with the format ID of the to-be-updated file.

When those format IDs are different from each other, the update-file processing unit 45 determines that the to-be-updated file is to be converted into the format usable by the terminal apparatus 2. Thus, the update-file processing unit 45 reads the to-be-updated file from the file DB 21 and instructs the conversion processing unit 46 so as to convert the read to-be-updated file into the format usable by the terminal apparatus 2. When those format IDs are identical, the update-file processing unit 45 determines that the to-be-updated file is not to be converted into the format usable by the terminal apparatus 2. Thus, the update-file processing unit 45 reads the to-be-updated file from the file DB 21 and issues, to the original-file transmitting unit 32, an instruction for transiting the read to-be-updated file in its original format to the terminal apparatus 2.

The conversion processing unit 46 converts the target file, read from the file DB 21 in response to the instruction from the designated-file processing unit 44 or the update-file processing unit 45, into the format usable by the terminal apparatus 2 to which the target file is to be transmitted. During conversion of the target file into the format usable by the terminal apparatus 2 to which the target file is to be transmitted, the conversion processing unit 46 uses the corresponding one of the formats stored in the format storage unit 23. Upon converting the target file into the usable format, the conversion managing unit 47 updates the file ID for identifying the target file to the file ID 24D associated with, in the terminal management table 24, the terminal ID 24A and the format ID 24C for the terminal apparatus 2. The conversion managing unit 47 issues, to the converted-file transmitting unit 33, an instruction for transmitting the file, converted by the conversion processing unit 46, to the terminal apparatus 2.

By referring to the connection statuses 24B associated with the file IDs 24D, the update-file processing unit 45 identifies the terminal apparatuses 2 whose connection statuses 24B indicate "not coupled". When any of the format IDs of the "not coupled" terminal apparatuses 2 is different from the format ID of the to-be-updated file, the update-file processing unit 45 determines that the to-be-updated file is to be converted. When the to-be-updated file is to be converted, the update-file processing unit 45 determines whether or not the amount of load of the server apparatus 3 is within a reference level, on the basis of a monitoring result of the load monitoring unit 42. The reference level corresponds to, for example, an arbitrary settable amount of load at which the amount of load of the server apparatus 3 becomes excessively large.

When the amount of load of the server apparatus 3 is within the reference level, the update-file processing unit 45 determines that the amount of load of the server apparatus 3 is at a normal level and permits the conversion of the to-be-updated file into the formats usable by the "not coupled" terminal apparatuses 2. When the conversion processing unit 46 converts the to-be-updated file for each "not coupled" terminal apparatus 2, the conversion managing unit 47 updates the terminal ID 24A, the format ID 24C, and the file ID 24D in the terminal management table 24.

The conversion managing unit 47 monitors the connection statuses 24B associated with the terminal IDs 24A for the terminal apparatuses 2 with respect to the converted file stored in the converted file 24E in the terminal management table 24. When the connection status 24B of the terminal apparatus 2 changes to the "currently coupled" state, the conversion managing unit 47 uses the converted-file transmitting unit 33 to transmit the converted file, stored in the converted file 24E, to the terminal apparatus 2.

When the amount of load of the server apparatus 3 is not within the reference level, the update-file processing unit 45 determines that the amount of load exceeds the normal level and prohibits the conversion of the to-be-updated file for the "not coupled" terminal apparatus 2. That is, since the amount of load of the server apparatus 3 is large, the file conversion is prohibited.

FIG. 8 is a block diagram illustrating one example of the terminal apparatus 2 according to the first embodiment. The terminal apparatus 2 illustrated in FIG. 8 includes a communication unit 51, a display unit 52, an operation unit 53, a storage unit 54, and a control unit 55. The storage unit 54 includes a file storage unit 54A, a converted-file storage unit 54B, and a format storage unit 54C. Examples of the storage unit 54 include a HDD, a RAM, and a ROM. The file storage unit 54A stores therein files received from the server apparatus 3. The converted-file storage unit 54B stores therein converted files received from the server apparatus 3. The format storage unit 54C stores therein the formats of application programs and so on available for file viewing and editing at the terminal apparatus 2.

The communication unit 51 communicates with the server apparatus 3 through the network 4. The communication unit 51 includes a transmitting unit 51A and a receiving unit 51B. The transmitting unit 51A transmits, for example, a file update request and a designation request to the server apparatus 3. The designation request includes the thumbnail ID of a designated one of the thumbnail images 5 and the format ID of the format usable by the terminal apparatus 2. The update request includes the file ID for identifying a to-be-updated file, the file contents, and the format ID. The receiving unit 51B includes a thumbnail receiving unit 61, an original-file receiving unit 62, and a converted-file receiving unit 63. The thumbnail receiving unit 61 receives the thumbnail images 5 of a file list from the server apparatus 3. The original-file receiving unit 62 receives, from the server apparatus 3, the original file of a target file corresponding to the designation request and the original file of a to-be-updated file corresponding to the update request. The converted-file receiving unit 63 receives a converted file resulting from the conversion of a to-be-updated file into a usable format.

The control unit 55 includes a file editing unit 71, a display controlling unit 72, a designation-request processing unit 73, and an update-request processing unit 74. The file editing unit 71 edits the contents of a file in response to a file-edit operation performed with the operation unit 53. The display controlling unit 72 displays the thumbnail images 5, received by the thumbnail receiving unit 61, on the display unit 52. When a desired one of the thumbnail images 5 displayed on the display unit 52 is designated according to a designation operation performed with the operation unit 53, the designation-request processing unit 73 generates a designation request for the file corresponding to the designated thumbnail image 5. In response to a file update operation performed with the operation unit 53, the update-request processing unit 74 generates a file update request including the file ID, the file contents, and the format ID of the to-be-updated file.

Figure 9A:
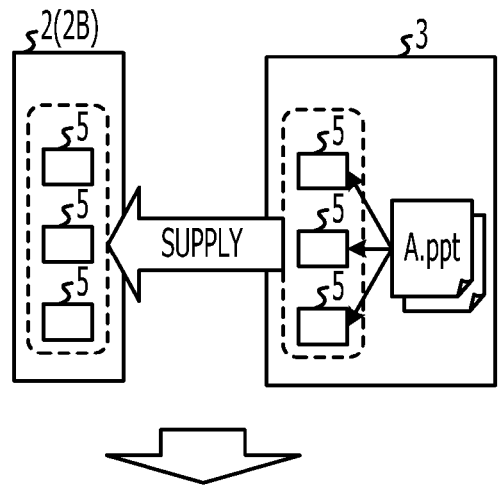
FIGS. 9A, 9B, and 9C illustrate examples of an operation of the file synchronization system according to the first embodiment.
Figure 9B:
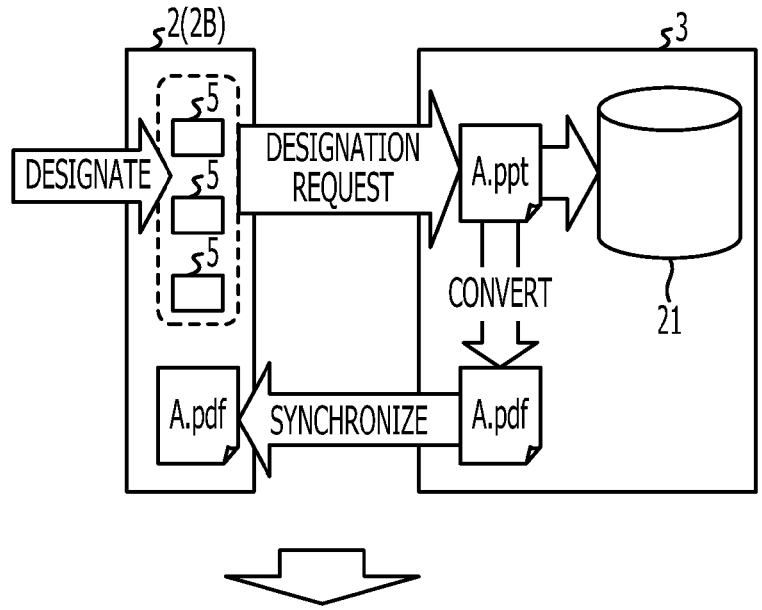
Figure 9C:
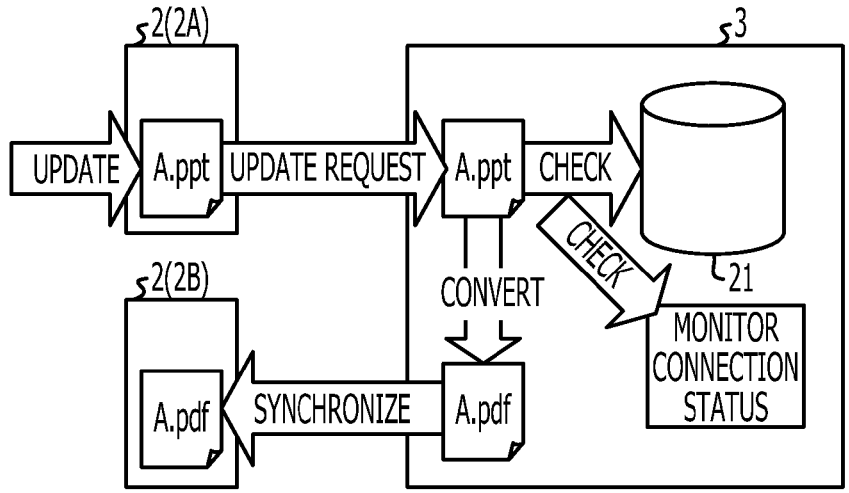

A description will be given of an operation of the file synchronization system 1 according to the first embodiment. FIGS. 9A to 9C illustrate examples of an operation of the file synchronization system 1 according to the first embodiment. FIG. 10 illustrates one example of processing operations performed by the terminal apparatus 2 and the server apparatus 3 with respect to file synchronization processing. In step S11, the thumbnail generating unit 41 in the control unit 15 in the server apparatus 3 illustrated in FIG. 10 generates thumbnail images 5 of files stored in the file DB 21. Upon generating the thumbnail images 5, the thumbnail generating unit 41 stores the thumbnail IDs 22A, the thumbnail images 22B, and the file IDs 22C of the thumbnail images 5 in the thumbnail DB 22 in association with each other. In step S12, the thumbnail transmitting unit 31 in the communication unit 11B in the server apparatus 3 transmits the generated thumbnail images 5 to the terminal apparatus 2.

In step S13, upon receiving the thumbnail images 5 from the server apparatus 3 via the thumbnail receiving unit 61, the display controlling unit 72 in the control unit 55 in the terminal apparatus 2 displays the thumbnail images 5 on the display unit 52, as illustrated in FIG. 9A. In step S14, the designation-request processing unit 73 in the control unit 55 in the terminal apparatus 2 determines whether or not, of the thumbnail images 5 displayed on the display unit 52, the thumbnail image 5 of a desired file is designated according to the designation operation from the operation unit 53, as illustrated in FIG. 9B. When the thumbnail image 5 is designated (Affirmative in step S14), the process proceeds to step S15 in which the designation-request processing unit 73 generates a target-file designation request containing the thumbnail ID for identifying the thumbnail image 5 and the format ID of the format usable by the terminal apparatus 2. In step S16, the transmitting unit 51A in the communication unit 51 in the terminal apparatus 2 transmits the target-file designation request to the server apparatus 3.

In step S17, the receiving unit 11A in the server apparatus 3 receives the target-file designation request from the terminal apparatus 2. In step S18, the designated-file processing unit 44 in the control unit 15 in the server apparatus 3 obtains the format ID and the thumbnail ID contained in the received target-file designation request. The designated-file processing unit 44 identifies, in the thumbnail DB 22, the file ID 22C of the target file corresponding to the obtained thumbnail ID 22A. The designated-file processing unit 44 identifies, in the file DB 21, the format ID 21C of the target file corresponding to the identified file ID 22C (21A). In step S19, the designated-file processing unit 44 compares the identified target-file format ID with the format ID in the designation request to determine whether or not the target file is to be converted.

When the target file is not to be converted (i.e., Negative in step S19) the process proceeds to step S20 in which the designated-file processing unit 44 reads the target file from the file DB 21. In step S21, the original-file transmitting unit 32 in the server apparatus 3 transmits, as the original file, the read target file to the terminal apparatus 2 that transmitted the designation request. Thereafter, the original-file transmitting unit 32 ends the processing operation of the server apparatus 3.

In step S22, the original-file receiving unit 62 in the receiving unit 51B in the terminal apparatus 2 receives the target-file original file from the server apparatus 3. The control unit 55 in the terminal apparatus 2 stores the received target-file original file in the file storage unit 54A in step S23, and then ends the processing operation of the terminal apparatus 2. As a result, the user of the terminal apparatus 2 performs, for example, viewing and editing on the target file stored in the file storage unit 54A.

When the target file is to be converted (Affirmative in step S19), the process proceeds to step S24 in which the designated-file processing unit 44 in the server apparatus 3 determines whether or not the target file has been converted into the format usable by the terminal apparatus 2. When the target file has not been converted into the format usable by the terminal apparatus 2 (Negative in step S24), the designated-file processing unit 44 reads, from the format storage unit 23, the format usable by the terminal apparatus 2. When multiple formats are usable by the terminal apparatus 2, the designated-file processing unit 44 selects the higher-priority format on the basis of the priority order 25B for the terminal ID 25A of the terminal apparatus 2, the priority order 25B and the terminal ID 25A being contained in the priority-order table 25 illustrated in FIG. 7.

In step S25, the conversion processing unit 46 in the control unit 15 converts the target file into the read format. In the example of FIG. 9B, the server apparatus 3 converts the target file in format "A.ppt" into format "A.pdf" usable by the terminal apparatus 2. After converting the target file into the format usable by the terminal apparatus 2, the process proceeds to step S26 in which the conversion managing unit 47 in the control unit 15 stores the converted file in the terminal management table 24. In step S27, the conversion managing unit 47 stores the file ID for identifying the target file as the file ID 24D contained in the terminal management table 24 and associated with the corresponding terminal ID 24A and the format ID 24C. In step S28, the converted-file transmitting unit 33 in the communication unit 11 in the server apparatus 3 reads the converted file of the target file, the converted file being stored in the terminal management table 24. In step S29, the converted-file transmitting unit 33 transmits the read converted file to the terminal apparatus 2 that transmitted the designation request. Thereafter, the converted-file transmitting unit 33 ends the processing operation of the server apparatus 3.

In step S30, the converted-file receiving unit 63 in the terminal apparatus 2 receives the converted file of the target file from the server apparatus 3. In step S31, the control unit 55 in the terminal apparatus 2 stores the received converted file in the converted-file storage unit 54B. Thereafter, the control unit 55 ends the processing operation of the terminal apparatus 2. As a result, the user of the terminal apparatus 2 obtains the target file stored in the file DB 21 and converted into the format usable by the terminal apparatus 2. As a result, the target file becomes editable and viewable.

When the target file has already been converted into the format usable by the terminal apparatus 2 (Affirmative in step S24), the process proceeds to step S28 in which the designated-file processing unit 44 reads the converted file of the target file.

In FIG. 10, upon detecting a file designation request from the terminal apparatus 2, the server apparatus 3 obtains the format ID and the thumbnail ID in the designated request and obtains the target file corresponding to the thumbnail ID from the file DB 21. The server apparatus 3 compares the format ID in the designation request with the format ID of the target file stored in the file DB 21, and determines whether or not the target file is to be converted, on the basis of a result of the comparison. When the target file is not to be converted, the server apparatus 3 transmits the target file, stored in the file DB 21, to the terminal apparatus 2 that transmitted the file designation request. As a result, the user of the terminal apparatus 2 obtains the file corresponding to the designation request.

When the target file is to be converted, the server apparatus 3 obtains the target file stored in the file DB 21 and converts the target file into the format usable by the terminal apparatus 2 that transmitted the file designation request. The server apparatus 3 transmits the converted file to the terminal apparatus 2. As a result, the user of the terminal apparatus 2 obtains the file corresponding to the designation request, the file resulting from the conversion of the target file not even usable by the terminal apparatus 2 into the format usable thereby.

Figure 11:
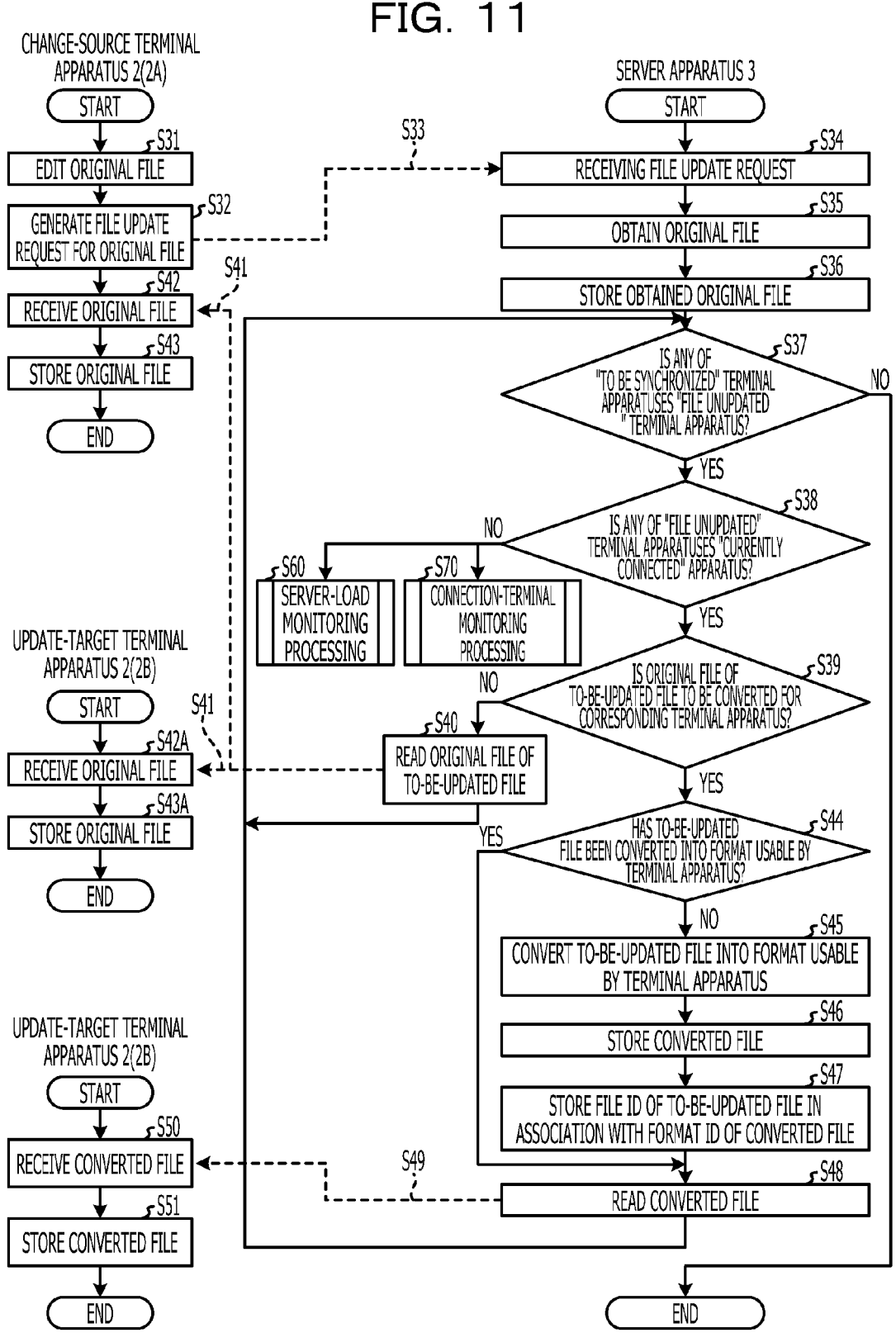
FIG. 11 illustrates one example of processing operations performed by the server apparatus and the terminal apparatuses with respect to file update processing.

FIG. 11 illustrates one example of the processing operations of the server apparatus 3 and the terminal apparatuses 2 with respect to file update processing. In step S31, in accordance with a file edit operation performed with the operation unit 53, the control unit 55 in the terminal apparatus 2 illustrated in FIG. 11 edits the original file stored in the file storage unit 54A. After editing the original file, in step S32, the update-request processing unit 74 in the control unit 55 generates a file update request containing the edited original file, the file ID of the original file, and the format ID in accordance with a file update operation. In step S33, the transmitting unit 51A in the terminal apparatus 2 transmits the update request for a to-be-updated file to the server apparatus 3, as illustrated in FIG. 9C.

Upon receiving the file update request from the terminal apparatus 2 in step S34, the process proceeds to step S35 in which the update-file processing unit 45 in the control unit 15 in the server apparatus 3 obtains the original file contained in the file update request. In step S36, the update-file processing unit 45 stores the obtained original file in the file DB 21. After storing the original file, the process proceeds to step S37 in which the update-file processing unit 45 determines whether or not any of the terminal apparatuses 2 that share the original file and that are to be synchronized is a terminal apparatus 2 that has not updated the file (i.e., a "file unupdated" terminal apparatus 2), on the basis of the connection statuses 24B in the terminal management table 24. When any of the terminal apparatuses 2 is a "file unupdated" terminal apparatus 2, (Affirmative in step S37), the process proceeds to step S38 in which the update-file processing unit 45 determines whether or not any of the "file unupdated" terminal apparatuses 2 is a "currently coupled" terminal apparatus 2.

When any of the terminal apparatuses 2 is a "currently coupled" terminal apparatus 2, (Affirmative in step S38), the process proceeds to step S39 in which the update-file processing unit 45 determines whether or not to the to-be-updated file is to be converted for the "file unupdated" and "currently coupled" terminal apparatus 2. The update-file processing unit 45 compares the format ID of the format usable by the "file unupdated" terminal apparatus 2 with the format ID of the to-be-updated file stored in the file DB 21, to determine whether or not the to-be-updated file is to be converted.

When the to-be-updated file is not to be converted for the "file unupdated" terminal apparatus 2 (Negative in step S39), i.e., when the format IDs are identical, the process proceeds to step S40 in which the update-file processing unit 45 reads the to-be-updated file from the file DB 21. In step S41, the update-file processing unit 45 transmits the read to-be-updated file to the "file unupdated" and "currently coupled" terminal apparatus 2. After transmitting the to-be-updated file to the "file unupdated" and "currently coupled" terminal apparatus 2, the process returns to step S37 in which the update-file processing unit 45 determines whether or not any of the "to be synchronized" terminal apparatuses 2 is a "file unupdated" terminal apparatus 2.

Upon receiving the to-be-updated file from the server apparatus 3 (in step S42), the "file unupdated" change-source terminal apparatus 2 (2A) stores the to-be-updated file in the file storage unit 54A in step S43 and ends the processing operation of the change-source terminal apparatus 2 (2A). Upon receiving the to-be-updated file from the server apparatus 3 (in step S42A), the "file unupdated" update-target terminal apparatus 2 (2B) stores the to-be-updated file in the file storage unit 54A in step S43A and ends the processing operation of the terminal apparatus 2 (2B).

When any of the "to be synchronized" terminal apparatuses 2 is not a "file unupdated" terminal apparatus 2 (Negative in step S37), the update-file processing unit 45 in the server apparatus 3 ends the processing operation of the server apparatus 3. When any of the "file unupdated" terminal apparatuses 2 is not "currently coupled" (Negative in step S38), the update-file processing unit 45 proceeds to step S60 (i.e., server-load monitoring processing) illustrated in FIG. 12 and step S70 (i.e., connection-terminal monitoring processing) illustrated in FIG. 13.

When the to-be-updated file is to be converted for the "file unupdated" terminal apparatus 2 (Affirmative in step S39), the process proceeds to step S44 in which the update-file processing unit 45 determines whether or not the to-be-updated file has been converted. When the to-be-updated file has not been converted into the format usable by the terminal apparatus 2 (Negative in step S44), the update-file processing unit 45 reads, from the format storage unit 23, the format usable by the terminal apparatus 2. When multiple formats are usable by the terminal apparatus 2, the update-file processing unit 45 selects the higher-priority format on the basis of the priority order 25B associated with the terminal ID 25A of the terminal apparatus 2, the terminal ID 25A and the priority order 25B being stored in the priority-order table 25 illustrated in FIG. 7.

In step S45, the conversion processing unit 46 in the control unit 15 converts the to-be-updated file into the read format. In the example of FIG. 9C, the server apparatus 3 converts the target file (A.ppt) into the file (A.pdf) in the format usable by the terminal apparatus 2. After converting the to-be-updated file into the format usable by the terminal apparatus 2, the process proceeds to step S46 in which the conversion managing unit 47 in the control unit 15 stores the converted file in the terminal management table 24. In step S47, the conversion managing unit 47 stores the file ID for identifying the to-be-updated file as the file ID 24D contained in the terminal management table 24 and associated with the corresponding terminal ID 24A and the format ID 24C. In step S48, the converted-file transmitting unit 33 in the server apparatus 3 reads the converted file of the to-be-updated file converted file, the converted file being stored in the terminal management table 24. In step S49, the converted-file transmitting unit 33 transmits the read converted file to the terminal apparatus 2 that has not updated the file and that is in the "currently coupled" state. The process proceeds to step S37 in which the control unit 15 in the server apparatus 3 determines whether or not a "file unupdated" terminal apparatus 2 exists.

In step S50, the converted-file receiving unit 63 in the terminal apparatus 2 receives the converted file of the to-be-updated file, the converted file being transmitted from the server apparatus 3. In step S51, the control unit 55 in the terminal apparatus 2 stores the received converted file in the converted-file storage unit 54B. Thereafter, the control unit 55 ends the processing operation of the terminal apparatus 2. As a result, the user of the terminal apparatus 2 obtains the file resulting from the conversion of the to-be-updated file, stored in the file DB 21, into the format usable by the terminal apparatus 2. As a result, the to-be-updated file becomes editable and viewable. The to-be-updated file is then synchronized between the terminal apparatuses 2.

When the to-be-updated file has already been converted into the format usable by the terminal apparatus 2 (Affirmative in step S44), the process proceeds to step S48 in which the update-file processing unit 45 reads the converted file of the to-be-updated file.

Upon detecting a file update request from the terminal apparatus 2, the server apparatus 3 illustrated in FIG. 11 determines whether or not any of the terminal apparatuses 2 that share the to-be-updated file and that are to be synchronized is a "file unupdated" and "currently coupled" terminal apparatus 2. The server apparatus 3 determines whether or not the to-be-updated file is to be converted for the "currently coupled" terminal apparatus 2. When the conversion of the to-be-updated file for the "currently coupled" terminal apparatus 2 is not to be performed, the server apparatus 3 obtains the to-be-updated file from the file DB 21 and transmits the to-be-updated file to the terminal apparatus 2. As a result, the user of the "currently coupled" terminal apparatus 2 obtains the latest file.

When the to-be-updated file is to be converted for the "currently coupled" terminal apparatus 2, the server apparatus 3 obtains the to-be-updated file from the file DB 21 and converts the to-be-updated file into the format usable by the terminal apparatus 2. The server apparatus 3 transmits the converted file of the to-be-updated file to the terminal apparatus 2. As a result, the user of the "currently coupled" terminal apparatus 2 obtains the latest file resulting from the conversion of the to-be-updated file not even usable by the terminal apparatus 2 into the format usable thereby.

Figure 12:
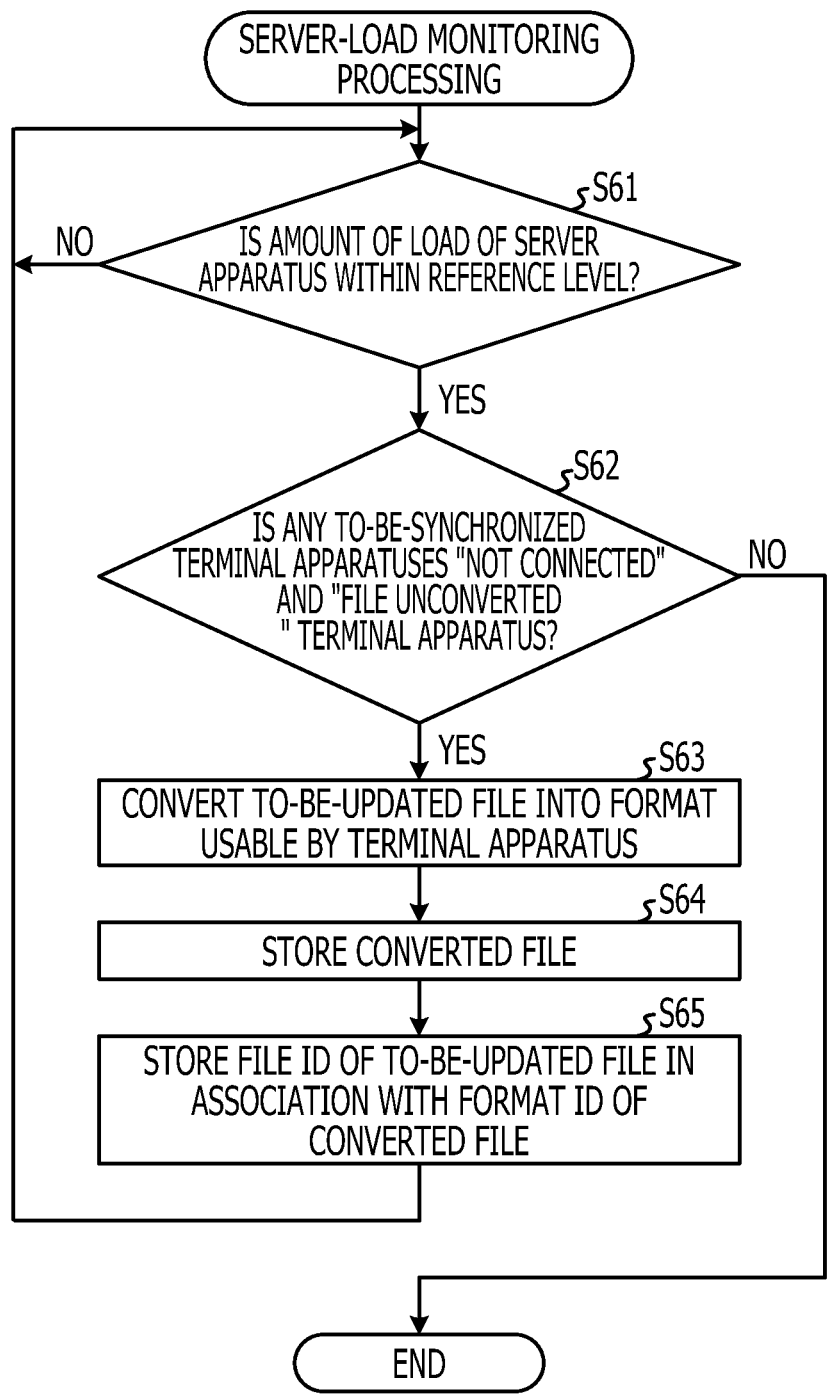
FIG. 12 illustrates one example of a processing operation of the server apparatus with respect to server-load monitoring processing.
Figure 13:
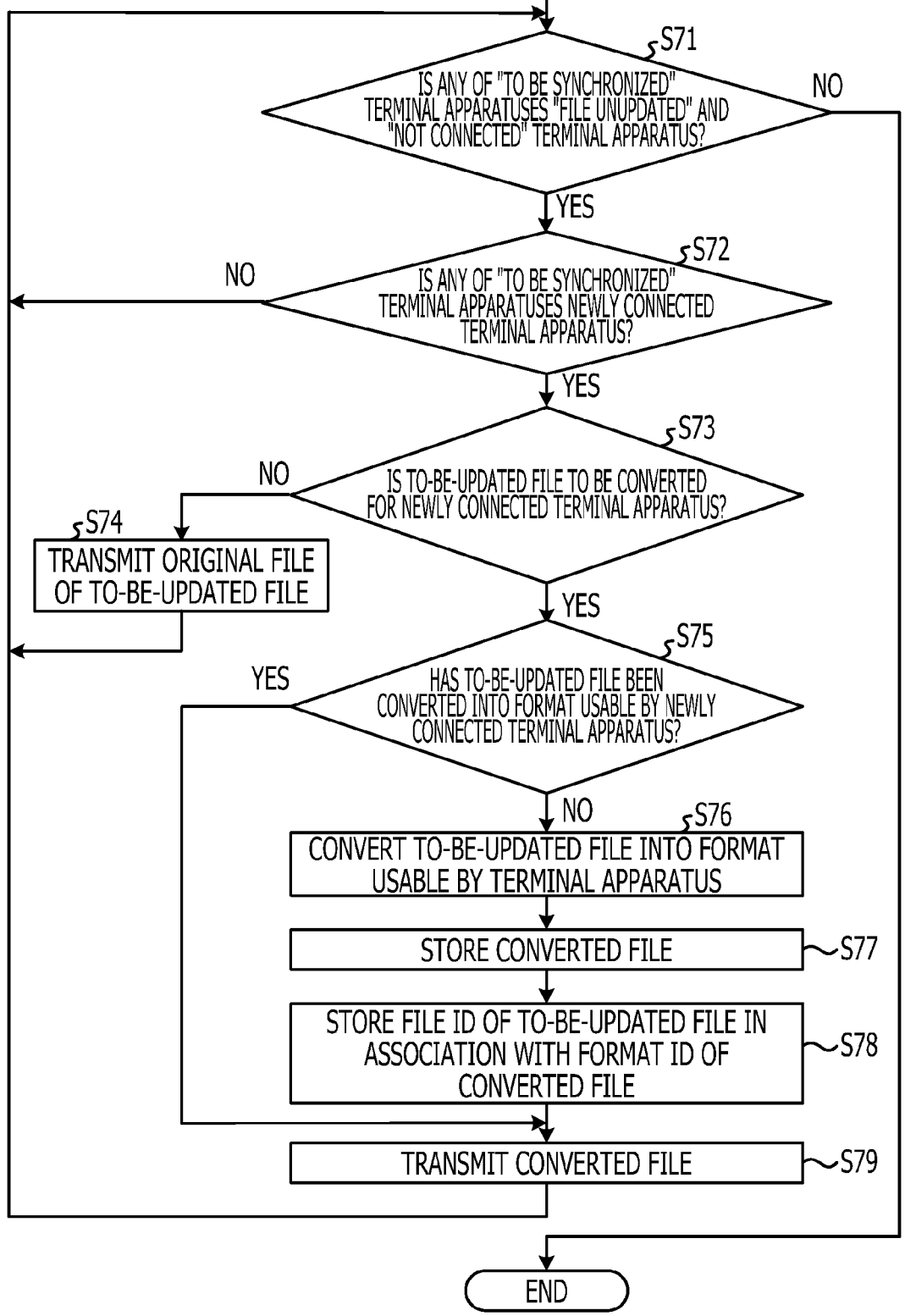
FIG. 13 illustrates one example of a processing operation of the server apparatus with respect to connection-terminal monitoring processing.

When any of the "to be synchronized" terminal apparatuses 2 is a "file unupdated and "not coupled" terminal apparatus 2, the server apparatus 3 performs the server-load monitoring processing illustrated in FIG. 12 and the connection-terminal monitoring processing illustrated in FIG. 13 in parallel.

FIG. 12 illustrates one example of the processing operation of the server apparatus 3 with respect to the server-load monitoring processing. In step S61, the update-file processing unit 45 in the control unit 15 in the server apparatus 3 illustrated in FIG. 12 determines whether or not the amount of load of the server apparatus 3 is within a reference level, on the basis of a monitoring result of the load monitoring unit 42. The amount of load within the reference level is, for example, the load at which the CPU utilization rate is 75% or less or the amount of available memory is 100 Mbytes or more. When the amount of load of the server apparatus 3 is within the reference level (Affirmative in step S61), the process proceeds to step S62 in which the update-file processing unit 45 determines whether or not any of the "to be synchronized" and "not coupled" terminal apparatuses 2 is a terminal apparatus 2 for which the to-be-updated file has not been converted. The "file unconverted" terminal apparatus 2 herein refers to, of the terminal apparatuses 2 for which the to-be-updated file is to be converted, the terminal apparatus 2 for which the to-be-updated file has not been converted.

When the "file unconverted" terminal apparatus 2 exists (Affirmative in step S62), the process proceeds to step S63 in which the conversion processing unit 46 in the control unit 15 converts the to-be-updated file into the format usable by the terminal apparatus 2. When multiple formats are usable by the terminal apparatus 2, the update-file processing unit 45 selects the format having the higher priority order 25B associated with the terminal ID 25A of the terminal apparatus 2, the terminal ID 25A and the priority order 25B being stored in the priority-order table 25 illustrated in FIG. 7.

After converting the to-be-updated file into the format usable by the terminal apparatus 2, the process proceeds to step S64 in which the conversion managing unit 47 in the control unit 15 stores the converted file in the terminal management table 24. In step S65, the conversion managing unit 47 stores the file ID for identifying the to-be-updated file as the file ID 24D contained in the terminal management table 24 and associated with the corresponding terminal ID 24A and the format ID 24C. After the file ID for identifying the to-be-updated file is stored in the terminal management table 24, the process proceeds to step S61 in which the update-file processing unit 45 determines whether or not the amount of load of the server apparatus 3 is within the reference level.

When the amount of load of the server apparatus 3 is not within the reference level (Negative in step S61), the update-file processing unit 45 determines that the amount of load of the server apparatus 3 is large and does not convert the to-be-updated file for the "not coupled" terminal apparatus 2. The process in step S61 is performed again.

When any of the "to be synchronized" and "not coupled" terminal apparatuses 2 is not a "file unconverted" terminal apparatus 2 (Negative in step S62), the update-file processing unit 45 ends the processing operation illustrated in FIG. 12.

When the amount of load of the server apparatus 3 is within the reference level, the server apparatus 3 illustrated in FIG. 12 determines whether or not any of the "to be synchronized" terminal apparatuses 2 is a "not coupled" and "file unconverted" terminal apparatus 2. When any of the "to be synchronized" terminal apparatuses 2 is in a "not coupled" and "file unconverted" terminal apparatus 2, the server apparatus 3 converts the to-be-updated file into the format usable by the terminal apparatus 2. The server apparatus 3 stores, in the terminal management table 24, the converted file of the to-be-updated file. That is, even when a file update request is detected, the server apparatus 3 converts the to-be-updated file for the "not coupled" and the "file unconverted" terminal apparatus 2 when the amount of load of the server apparatus 3 is within the reference level. With this arrangement, the server apparatus 3 performs the conversion processing at separate timings to thereby distribute the processing load.

When the amount of load of the server apparatus 3 is not within the reference level, the server apparatus 3 prohibits the format conversion of the to-be-updated file even when the "to be synchronized", "not coupled, and "file unconverted" terminal apparatus 2 exists. As a result of the conversion prohibition, the server apparatus 3 distributes the concentrated processing.

FIG. 13 illustrates one example of the processing operation of the server apparatus 3 with respect to the connection-terminal monitoring processing. In step S71, the update-file processing unit 45 in the server apparatus 3 illustrated in FIG. 13 determines whether or not any of the terminal apparatuses 2 that share the to-be-updated file and that are to be synchronized is a "file unupdated" and "not coupled" terminal apparatus 2. When a "file unupdated" and "not coupled" terminal apparatus 2 exists (Affirmative in step S71), the process proceeds to step S72 in which the update-file processing unit 45 determines whether or not any of the "file unupdated" and "not coupled" terminal apparatuses 2 is a newly coupled terminal apparatus 2. The "newly coupled terminal apparatus 2" refers to a terminal apparatus 2 that changes its operation state from the "not coupled" state to the "currently coupled" state.

When any of the terminal apparatuses 2 is a newly coupled terminal apparatus 2, (Affirmative in step S72), the process proceeds to step S73 in which the update-file processing unit 45 determines whether or not the to-be-updated file is to be converted for the newly coupled terminal apparatus 2. The update-file processing unit 45 compares the format ID of the format usable by the newly coupled and "file unupdated" terminal apparatus 2 with the format ID of the to-be-updated file stored in the file DB 21, to determine whether or not the to-be-updated file is to be converted.

When the to-be-updated file is not to be converted for the "newly coupled" and "file unupdated" terminal apparatus 2 (Negative in step S73), the process proceeds to step S74 in which update-file processing unit 45 transmits the to-be-updated file to the "newly coupled" and "file unupdated" terminal apparatus 2. After transmitting the to-be-updated file to the "newly coupled" and "file unupdated" terminal apparatus 2, the process proceeds to step S71 in which the update-file processing unit 45 determines whether or not any of the "to be synchronized" terminal apparatuses 2 is a "file unupdated" and "not coupled" terminal apparatus 2.

When any of the "to-be-synchronized" terminal apparatuses 2 is not a "file unupdated" and "not coupled" terminal apparatus 2 (Negative in step S71), the update-file processing unit 45 ends the processing operation illustrated in FIG. 13. When any of the "file unupdated" and "not coupled" terminal apparatuses 2 is not a newly coupled terminal apparatus 2 (Negative in step S72), the process returns to step S71 in which the update-file processing unit 45 determines whether or not a "file unupdated" and "not coupled" terminal apparatus 2 exists.

When the to-be-updated file is to be converted for the "file unupdated" terminal apparatus 2 (Affirmative in step S73), the process proceeds to step S75 in which the update-file processing unit 45 determines whether or not the to-be-updated file has been converted into the format usable by the newly coupled terminal apparatus 2. When the to-be-updated file has not been converted into the format usable by the terminal apparatus 2 (Negative in step S75), the conversion processing unit 46 reads, from the format storage unit 23, the format usable by the terminal apparatus 2. When multiple formats are usable by the terminal apparatus 2, the update-file processing unit 45 selects the higher-priority format on the basis of the priority order 25B associated with the terminal ID 25A of the terminal apparatus 2, the terminal ID 25A and the priority order 25B being stored in the priority-order table 25 illustrated in FIG. 7.

In step S76, the conversion processing unit 46 converts the to-be-updated file into the read format. After converting the to-be-updated file into the format usable by the terminal apparatus 2, the process proceeds to step S77 in which the conversion managing unit 47 stores the converted file in the terminal management table 24. In step S78, the conversion managing unit 47 stores the file ID for identifying the to-be-updated file as the file ID 24D contained in the terminal management table 24 and associated with the corresponding terminal ID 24A and the format ID 24C. In step S79, the converted-file transmitting unit 33 transmits the converted file of the to-be-updated file, the converted file being stored in the terminal management table 24, to the "newly coupled" and "file unupdated" terminal apparatus 2. The process returns to step S71 in which the update-file processing unit 45 determines whether or not any "file unupdated" and "not coupled" terminal apparatus 2 exists.

When the to-be-updated file has already been converted into the format usable by the terminal apparatus 2 (Affirmative in step S75), the process proceeds to step S79 in which the converted-file transmitting unit 33 transmits the to-be-updated file, converted and stored in the terminal management table 24, to the terminal apparatus 2. The case in which the to-be-updated file has been converted, in step S75, refers to, for example, a case in which a converted file is stored in the terminal management table 24 in the server-load monitoring processing or the like illustrated in FIG. 12.

When any of the "to be synchronized" terminal apparatuses 2 is a "file unupdated" and "not coupled" terminal apparatus 2, the server apparatus 3 illustrated in FIG. 13 determines whether or not a newly coupled terminal apparatus 2 exists. When a newly coupled terminal apparatus 2 exists, the server apparatus 3 determines whether or not the to-be-updated file is to be converted for the newly coupled terminal apparatus 2. When the to-be-updated file is not to be converted for the newly coupled terminal apparatus 2, the server apparatus 3 obtains the to-be-updated file from the file DB 21 and transmits the to-be-updated file to the newly coupled terminal apparatus 2. With this arrangement, the user of the to-be-synchronized terminal apparatus 2 obtains the latest file at timing at which the operation thereof changes from the "not coupled state" to the "newly coupled" state.

When the to-be-updated file is to be converted for the newly coupled terminal apparatus 2, the server apparatus 3 obtains the to-be-updated file from the file DB 21 and converts the to-be-updated file into the format usable by the terminal apparatus 2. The server apparatus 3 transmits the converted file to the newly coupled terminal apparatus 2. Thus, since the to-be-updated file not even usable by the "to be synchronized" terminal apparatus 2 has been converted into the format usable thereby, the to-be-synchronized terminal apparatus 2 obtains the latest file at timing when the operation changes from the "not coupled" state to the "newly coupled" state.

When the converted file of the to-be-updated file has been stored in the terminal management table 24 and the terminal apparatus 2 for the converted file is newly coupled, the server apparatus 3 transmits the converted file to the terminal apparatus 2. With this arrangement, since the to-be-updated file not even usable by the "to be synchronized" terminal apparatus 2 has been converted into the format usable thereby, the terminal apparatus 2 obtains the latest file at timing when the operation changes from the "not coupled" state to the "newly coupled" state.

Upon detecting an update request, the server apparatus 3 according to the first embodiment determines whether or not the "to be synchronized" terminal apparatus 2 is "currently coupled". When the "to be synchronized" terminal apparatus 2 is "currently coupled", the server apparatus 3 converts the to-be-updated file into the format usable by the "to be synchronized" terminal apparatus 2. The server apparatus 3 transmits the file, converted into the format usable by the terminal apparatus 2, to the "to be synchronized" terminal apparatus 2, so as to cause the "to be synchronized" terminal apparatuses 2 to synchronize the to-be-updated file therebetween. Thus, since the server apparatus 3 transmits the to-be-updated file to the "currently coupled" terminal apparatus 2, the processing load for the file synchronization is distributed.

When the "to be synchronized" terminal apparatus 2 is not "currently coupled", the server apparatus 3 according to the first embodiment basically prohibits the conversion processing of the to-be-updated file for the "to be synchronized" and "not coupled" terminal apparatus 2. That is, since the server apparatus 3 prohibits the conversion processing of the to-be-updated file for the "to be synchronized" and "not coupled" terminal apparatus 2, the file-synchronization processing that is temporarily concentrated is distributed.

Even when the "to be synchronized" terminal apparatus 2 is not "currently coupled", when the amount of load of the server apparatus 3 is within the reference level, the server apparatus 3 according to the first embodiment converts the to-be-converted file for the "to be synchronized" and "not coupled" terminal apparatus 2 and stores the converted file. When the operation of the "not coupled" terminal apparatus 2 changes to the "currently coupled" state, the server apparatus 3 transmits the stored converted file to the terminal apparatus 2. As a result, since the server apparatus 3 starts the conversion of the to-be-updated file for the "to be synchronized" and "not coupled" terminal apparatus 2 in accordance with the amount of load, the processing for file synchronization is distributed.

Even when the "to be synchronized" terminal apparatus 2 is not "currently coupled", when the amount of load of the server apparatus 3 exceeds the reference level, the server apparatus 3 according to the first embodiment prohibits the conversion processing for the to-be-converted file for the "to be synchronized" and "not coupled" terminal apparatus 2. With this arrangement, the server apparatus 3 distributes the file-synchronization processing load that is temporarily concentrated.

According to the first embodiment, when a target file is converted into the format usable by the terminal apparatus 2 in response to a file synchronization request, such as the file designation request or the update request, the format is determined based on the priority order 25B in the priority-order table 25. Thus, the server apparatus 3 easily determines the format usable by the terminal apparatus 2.

A description in the first embodiment described above has been given in conjunction with an example in which a file is shared between the terminal apparatuses 2 of one user. A file synchronization system in which a file is shared between the terminal apparatuses 2 of multiple users will be described in a second embodiment.

Figure 14:
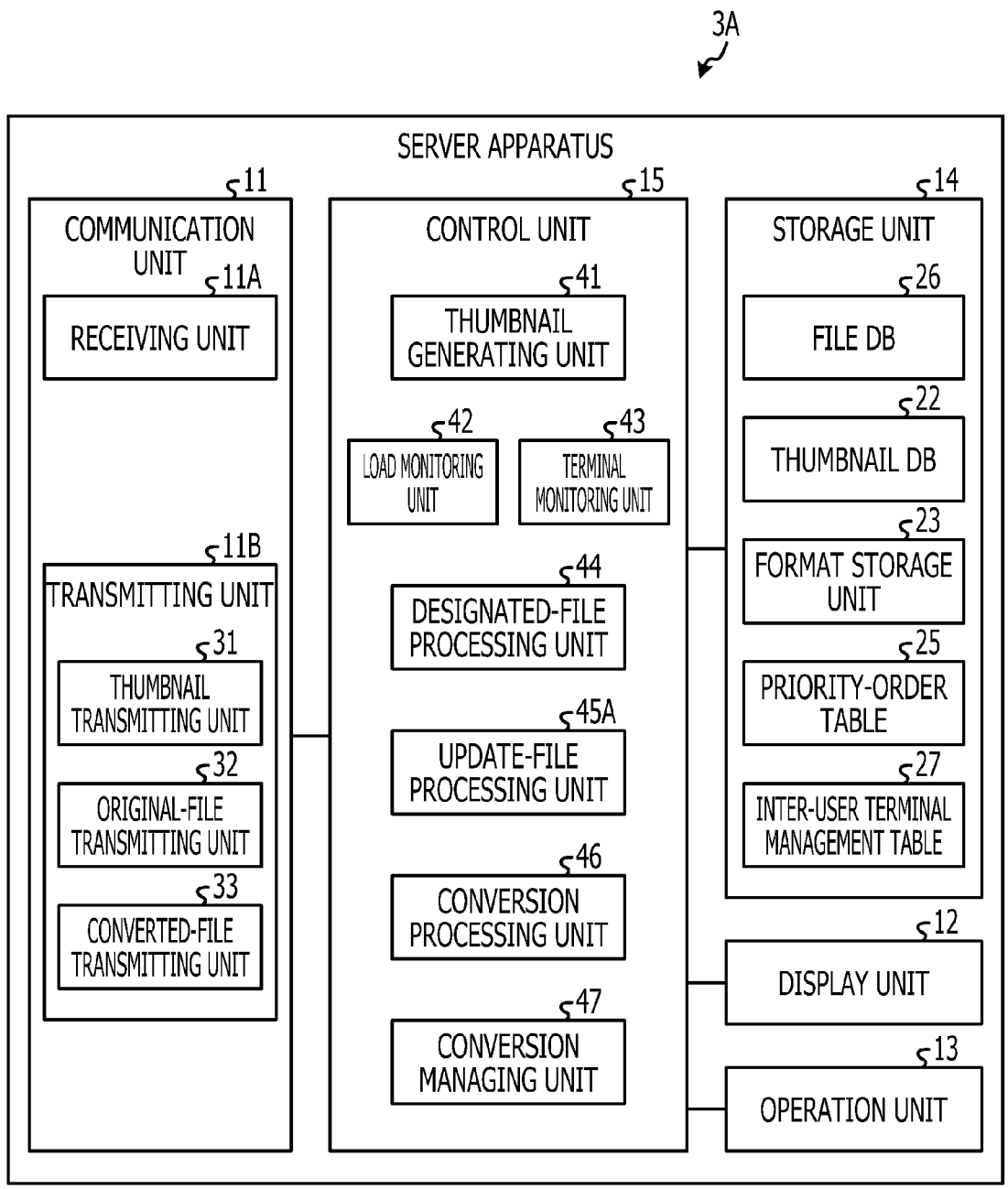
FIG. 14 illustrates one example of a server apparatus according to a second embodiment.

FIG. 14 illustrates one example of a server apparatus according to the second embodiment. Elements that are similar to those in the server apparatus 3 according to the first embodiment are denoted by the same reference numerals, and descriptions of the redundant configurations and operations are omitted hereinafter. A storage unit 14 in a server apparatus 3A illustrated in FIG. 14 has a file DB 26, instead of the file DB 21, and an inter-user terminal management table 27, instead of the terminal management table 24.

FIG. 15 illustrates one example of a table structure of the file DB 26. The file DB 26 illustrated in FIG. 15 manages file IDs 26A, file contents 26B, file format IDs 26C, user IDs 26D, and terminal IDs 26E in association with each other. The file ID 26A is an ID for identifying a file. The file contents 26B represent file data. The format ID 26C is an ID for identifying the format of the file. The user IDs 26D are IDs for identifying users who share the file. The terminal ID 26E is an ID for identifying the terminal apparatuses 2 of users who share the file.

The control unit 15 refers to the file DB 26, and when the file ID 26A is "F11", the control unit 15 recognizes that the file contents 26B are "XXX", the file format ID 26C is "Ppt", the user IDs 26D are "U11, U12, . . . ", and the terminal IDs 26E are "T21, T22, . . . ". The control unit 15 refers to the file DB 26 to recognize a file, the format of the file, users that share the file, and the terminal apparatuses 2 of the users.

Figure 16:
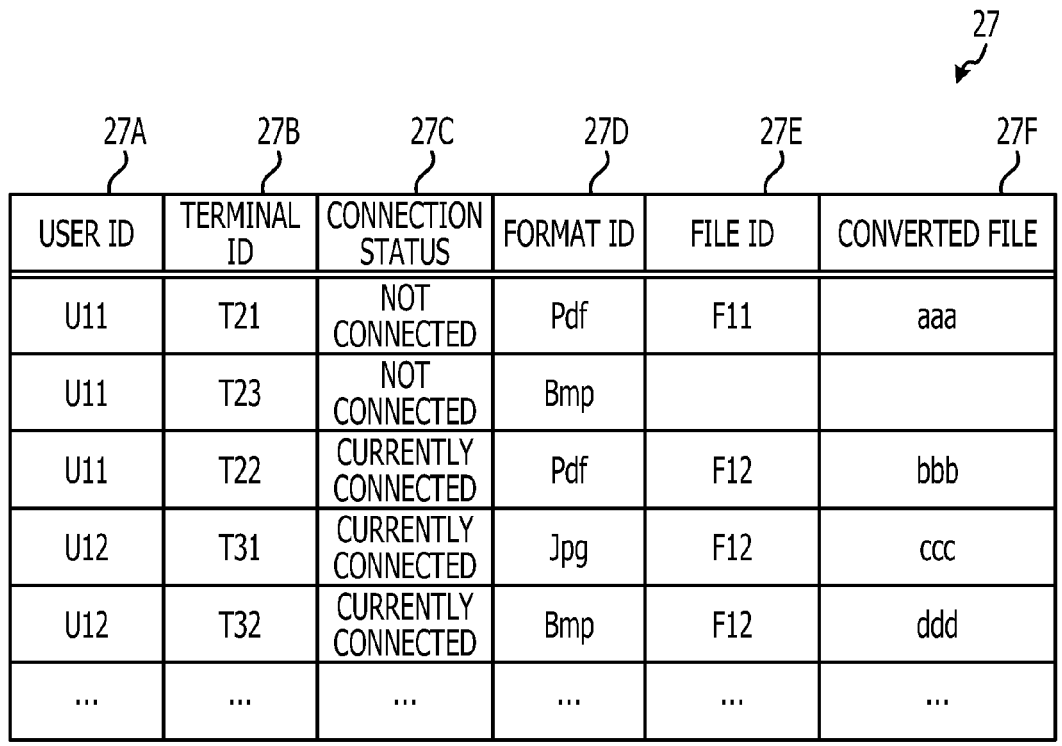
FIG. 16 illustrates one example of a table structure of an inter-user management table.

FIG. 16 illustrates one example of a table structure of the inter-user terminal management table 27. The inter-user terminal management table 27 illustrated in FIG. 16 contains user IDs 27A, terminal IDs 27B, connection statuses 27C, format IDs 27D, file IDs 27E, and converted files 27F in association with each other. The user ID 27A is an ID for identifying a user. The terminal ID 27B is an ID for identifying the terminal apparatus 2. The connection status 27C indicates the communication state of the terminal apparatus 2. The format ID 27D is an ID for identifying the format usable by the corresponding terminal apparatus 2. The file ID 27E is an ID for identifying, when a converted file for the terminal apparatus 2 is available, the original file of the converted file. The converted file 27F is data of the file.

For example, when referring to the user ID 27A "U11" and the terminal ID 27B "T22" in the inter-user terminal management table 27, the control unit 15 recognizes that the connection status 27C is "currently coupled" and the format ID 27D is "Pdf". For example, for a file converted into the "Pdf" format, the control unit 15 recognizes that the file ID 27E of the file is "F12" and the converted file 27F is "bbb". The control unit 15 refers to the inter-user terminal management table 27 to recognize that the terminal apparatus 2 of each user, the format usable by the terminal apparatus 2, the connection status of the terminal apparatus 2, a converted file for the terminal apparatus 2, and the original file of the converted file.

In response to a file-update request from the terminal apparatus 2, an update-file processing unit 45A obtains the user ID 26D from the file DB 26 by using the file ID 26A of the to-be-updated file corresponding to the update request. The update-file processing unit 45A refers to the inter-user terminal management table 27 to recognize the connection status 27C for the terminal ID 27B having the user ID 27A. The update-file processing unit 45A identifies the terminal apparatus 2 whose connection status 27C indicates "currently coupled". Upon identifying the "currently coupled" terminal apparatus 2, the update-file processing unit 45A refers to the inter-user terminal management table 27 to compare the format ID of the format usable by the terminal apparatus 2 with the format ID of the to-be-updated file.

When those format IDs are different from each other, the update-file processing unit 45A reads the to-be-updated file from the file DB 26. The update-file processing unit 45A instructs the conversion processing unit 46 so as to convert the read to-be-updated file into the format usable by the terminal apparatus 2.

When those format IDs are identical, the update-file processing unit 45A reads the to-be-updated file from the file DB 26. The update-file processing unit 45A instructs the original-file transmitting unit 32 so as to transmit the read to-be-updated file in its original format to the terminal apparatus 2.

By referring to the connection status 27C associated with the terminal ID 27B for the user ID 27A, the update-file processing unit 45A identifies the terminal apparatuses 2 whose connection statuses 27C indicate "not coupled". When any of the identified "not coupled" terminal apparatuses 2 is a terminal apparatus 2 for which the to-be-updated file is to be converted, the update-file processing unit 45A determines whether or not the amount of load of the server apparatus 3 is within a reference level, on the basis of a monitoring result of the load monitoring unit 42.

When the amount of load of the server apparatus 3A is within the reference level, the update-file processing unit 45A permits the conversion of the to-be-updated file into the format usable by the "not coupled" terminal apparatus 2. When the amount of load of the server apparatus 3A is not within the reference level, the update-file processing unit 45A prohibits the conversion of the to-be-updated file for the "not coupled" terminal apparatus 2.

Upon converting the to-be-updated file into the format usable by the terminal apparatus 2, the conversion managing unit 47 stores, in the inter-user terminal management table 27, the to-be-updated file as a converted to-be-updated file for another user. For conversion of the to-be-updated file into the format currently usable by the terminal apparatus 2 of the user, the update-file processing unit 45A refers to the inter-user terminal management table 27. The update-file processing unit 45A determines whether or not a stored converted file whose to-be-updated file and format are the same type as the format of the to-be-updated file that is to be converted is contained in the inter-user terminal management table 27.

When a converted file for another user is contained in the inter-user terminal management table 27, the update-file processing unit 45A uses the converted file as an update file for this time.

For example, it is assumed that the terminal apparatus "T32" of the user "U12" converts the update file "F12" into a converted file "ddd" in format "Bmp". In this case, the inter-user terminal management table 27 contains the user ID 27A "U12", the terminal ID 27B "T32", the format ID 27D "Bmp", the file ID 27E "F12", and the converted file 27F "ddd".

It is assumed that the update-file processing unit 45A converts the to-be-updated file "F12" into the "Bmp" format on the basis of the user "U11", the terminal apparatus "T23", the format "Bmp", and the to-be-updated file "F12". In this case, the update-file processing unit 45A refers to the inter-user terminal management table 27 to determine whether or not any of the stored converted files 27F is the same type as the to-be-updated file "F12" and the format "Bmp". When the converted file that is the same type is available, the update-file processing unit 45A obtains the converted file "ddd" for the user "U12", the file "ddd" being associated with the to-be-updated file "F12" and the format "Bmp". The update-file processing unit 45A does not convert the to-be-updated file for the user "U11" and stores the converted file "ddd" for the user "U12" as the converted file for the terminal apparatus "T23" of the user "U11".

When the to-be-updated file is converted into the format of the terminal apparatuses 2 of one user, the server apparatus 3A according to the second embodiment stores the converted file in the inter-user terminal management table 27. During conversion of the to-be-updated file into the format usable by the terminal apparatus 2 of another user, the server apparatus 3A determines whether or not any stored converted file that is the same type as the to-be-updated file and the usable format is contained in the inter-user terminal management table 27. When any stored converted file is contained in the inter-user terminal management table 27, the server apparatus 3A reads the stored converted file and stores the read converted file as a converted file for the other user. As a result, when a converted file that is the same type as the to-be-updated file and the usable format is available, the server apparatus 3A uses the converted file for multiple users to thereby reduce the load for the conversion processing.

According to the first embodiment described above, in response to a file update request, the server apparatus 3 transmits the to-be-updated file to the terminal apparatuses 2 of one user that shares the to-be-updated file. When multiple terminal apparatuses 2 belong to one user, the to-be-updated file may be preferentially transmitted to the mostly recently used one of the multiple terminal apparatuses 2. Such a case will now be described in a third embodiment.

Figure 17:
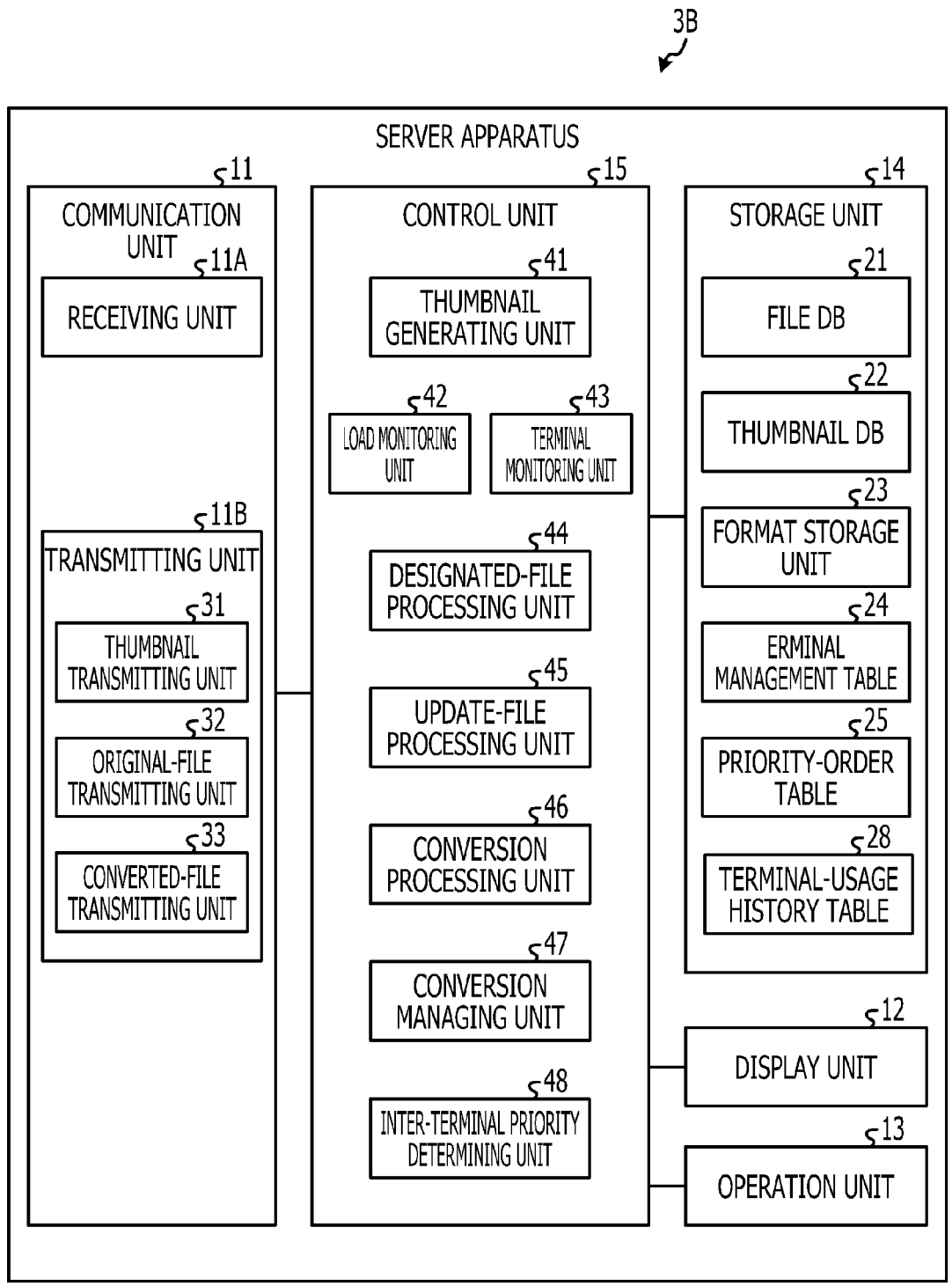
FIG. 17 illustrates one example of a server apparatus according to a third embodiment.
Figure 18:
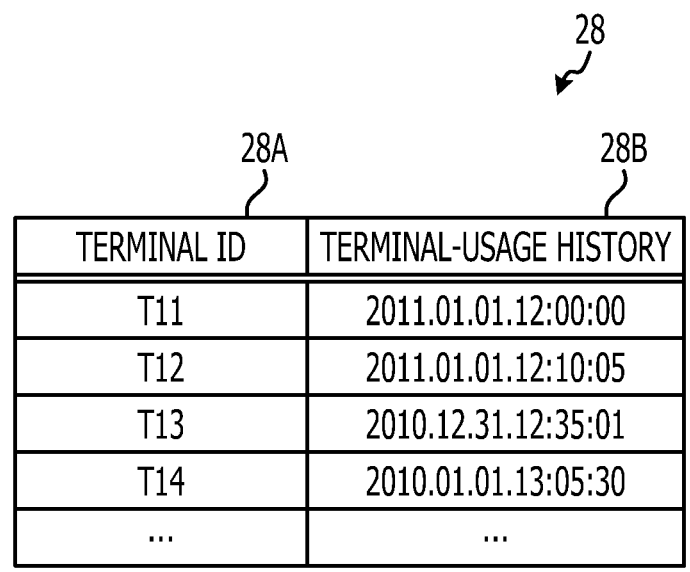
FIG. 18 illustrates one example of a table structure of a terminal-usage history table.

FIG. 17 illustrates one example of a server apparatus according to the third embodiment. Elements that are similar to those in the file synchronization system 1 according to the first embodiment are denoted by the same reference numerals, and descriptions of the redundant configurations and operations are omitted hereinafter. A storage unit 14 in a server apparatus 3B illustrated in FIG. 17 has a terminal-usage history table 28. FIG. 18 illustrates one example of a table structure of the terminal-usage history table 28. The terminal-usage history table 28 illustrated in FIG. 18 manages terminal IDs 28A and terminal-usage history 28B in association with each other. The terminal-usage history 28B is usage history of operations of the terminal apparatus 2. Examples of the terminal operations include keyboard inputs, mouse operations, and button operations. An inter-terminal priority determining unit 48 in a control unit 15 refers to the terminal-usage history 28B in the terminal-usage history table 28 to identify the terminal ID 28A of the terminal apparatus 2 that was used most recently. The inter-terminal priority determining unit 48 refers to the terminal-usage history 28B to determine a terminal apparatus "T14" at "2010.01.01 13:05:30" as having first priority. When multiple "to be synchronized" and "currently coupled" terminal apparatuses 2 exist, the update-file processing unit 45 in the control unit 15 identifies the "currently coupled" terminal apparatuses 2 in order with the most recent terminal-usage history first.

Upon sequentially identifying the "currently coupled" terminal apparatus 2 with the most recent terminal-usage history first, the update-file processing unit 45 determines whether or not the to-be-updated file is to be converted for the terminal apparatus 2. When the to-be-updated file for the terminal apparatus 2 is to be converted, the update-file processing unit 45 causes the conversion processing unit 46 to convert the to-be-updated file and transmits the converted file to the terminal apparatus 2. When the to-be-updated file for the terminal apparatus 2 is not be converted, the update-file processing unit 45 transmits the to-be-updated file to the terminal apparatus 2. That is, the server apparatus 3B refers to the terminal-usage history 28B to identify the terminal apparatuses 2 in order with the most recent terminal-usage history first and transmits the to-be-updated file to the sequentially identified terminal apparatuses 2.

When multiple "to be synchronized", "not coupled", and "file unconverted" terminal apparatuses 2 exist, the update-file processing unit 45 identifies the "not coupled" and the "file unconverted" terminal apparatuses 2 in order with the most recent terminal-usage history first.

When the amount of the server load is within the reference level, the update-file processing unit 45 sequentially identifies the "not coupled" and "file unconverted" terminal apparatuses 2 in order with the most recent terminal-usage history first. The conversion processing unit 46 converts the to-be-updated file for the sequentially identified terminal apparatuses 2. The conversion managing unit 47 sequentially stores the converted to-be-updated files in the terminal management table 24.

It is now assumed that multiple converted files to be transmitted to the "file unupdated" terminal apparatuses 2 are contained in the terminal management table 24 and multiple ones of the "file unupdated" terminal apparatuses 2 are newly coupled. In this case, the update-file processing unit 45 identifies the terminal apparatuses 2 in order with the most recent terminal-usage history first. On the basis of the terminal-usage history, the converted-file transmitting unit 33 sequentially transmits the converted files to the identified terminal apparatuses 2.

In the third embodiment, upon detecting a file update request, the server apparatus 3B preferentially transmits the to-be-updated file to the mostly recently used one of the "currently coupled" terminal apparatuses 2, on the basis of the terminal-usage history. That is, the server apparatus 3B preferentially transmits the latest file to the terminal apparatus 2 that is mostly recently used, i.e., the terminal apparatus 2 that is highly likely to be currently used.

It is assumed that in the third embodiment, when the server apparatus 3B detects a file update request, the amount of load of the server apparatus 3B is within the reference level and multiple ones of the "not coupled" terminal apparatuses 2 are terminal apparatuses 2 for which to-be-updated files are to be converted. In this case, on the basis of the terminal-usage history, the server apparatus 3B preferentially converts the to-be-updated file for the mostly recently used one of the terminal apparatuses 2. As a result, the latest file for, of the multiple terminal apparatuses 2, the terminal apparatus 2 that is highly likely to be currently used is obtained.

Although the terminal-usage history is used in the third embodiment described above, a terminal-usage frequency resulting from counting of the number of times the terminal apparatus 2 is used may also be used. In this case, on the basis of the terminal-usage frequency, the server apparatus 3B preferentially converts the to-be-updated file for the mostly frequently used one of the terminal apparatuses 2.

The elements of the apparatuses illustrated in the accompanying drawings may be physically configured differently from those illustrated. That is, specific forms of distribution/integration of the apparatuses are not limited to those illustrated, and all or a portion thereof may be functionally or physically distributed or integrated in an arbitrary manner, depending on various loads, a usage state, and so on.

All or an arbitrary one of the processing functions realized by each apparatus may be executed by a microcomputer, such as a CPU (central processing unit), an MPU (micro processing unit), or an MCU (micro controller unit). Needless to say, all or an arbitrary one of the processing functions may also be executed by a program analyzed and executed by a CPU (or a microcomputer, such as an MPU or MCU) or wired-logic-based hardware.

A computer may execute a prepared program to realize the processing described in the embodiments. Accordingly, a description below will be given of one example of a computer for executing a program having functions that are similar to those in the embodiments described above. FIG. 19 illustrates a computer for executing a file synchronization program.

As illustrated in FIG. 19, a computer 100 that executes a file synchronization program has a HDD (hard disk drive) 110, a RAM (random access memory) 120, a ROM (read only memory) 130, and a CPU 140. The computer 100 further has an operation unit 150, a display unit 160, and a communication unit 170. In the computer 100, the HDD 110, the RAM 120, the ROM 130, the CPU 140, the operation unit 150, the display unit 160, and the communication unit 170 are coupled through a bus 180.

The HDD 110 pre-stores therein a file synchronization program that has the same functions as those described in the above-described embodiments. The file synchronization program may be recorded to the ROM 130 or to a computer-readable recording medium via a driver (not illustrated), rather than to the HDD 110. Examples of the recording medium include portable recording medium, such as a CD-ROM, a DVD, and a USB (universal serial bus) memory, as well as a semiconductor memory, such as a flash memory. Examples of the file synchronization program include a determination program 110A, a conversion program 110B, and a transmission program 110C, as illustrated in FIG. 19. The determination program 110A, the conversion program 110B, and the transmission program 110C may be integrated together or distributed as appropriate, as in the elements of the server apparatus 3 illustrated in FIG. 3.

The CPU 140 reads the determination program 110A, the conversion program 110B, and the transmission program 110C from the HDD 110 and executes the programs in the RAM 120. As illustrated in FIG. 19, the determination program 110A, the conversion program 110B, and the transmission program 110C serve as a determination process 120A, a conversion process 120B, and a transmission process 120C, respectively, in the RAM 120.

The HDD 110 stores therein files shared by the terminal apparatuses and formats usable by the terminal apparatuses. Upon detecting a synchronization request for a file to be synchronized, the CPU 140 determines whether or not terminal apparatuses that are to synchronize the file is currently capable of receiving a to-be-synchronized file. When the to-be-synchronized terminal apparatus is currently capable of receiving the to-be-synchronized file, the CPU 140 converts the to-be-synchronized file into the format usable by the to-be-synchronized terminal apparatus. The CPU 140 transmits the to-be-synchronized file converted into the format usable by the terminal apparatuses so as to cause the terminal apparatuses to synchronize the file. Thus, the processing load for file synchronization between the terminal apparatuses is distributed.

According to the embodiments described above, the processing load for file synchronization between the terminal apparatuses is distributed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A file synchronization method comprising:
   determining whether a first terminal apparatus is capable of receiving a first file in response to a synchronization request for the first file;
   converting, by at least one processor, the first file into a first format usable by the first terminal apparatus to acquire a first converted file, when the first terminal apparatus is capable of receiving the first file;
   storing, in a memory coupled to the at least one processor, information relating to the first terminal apparatus, identification information for identifying the first file, the first format, and the first converted file converted into the first format, in association with a user of the first terminal apparatus;
   determining, when a second file for a second terminal apparatus is to be converted into a second format, as a second converted file, usable by the second terminal apparatus in response to the synchronization request, whether the second converted file converted into the second format usable by the second terminal apparatus is included in the memory;
   storing, when the second converted file is included in the memory, identification information of the second file for the second terminal apparatus and the second format usable by the second terminal apparatus in the memory in association with the second converted file;
   transmittinq the stored second converted file to the second terminal apparatus;
   determining whether a load amount of a server apparatus that converts the first file into the first format is within a reference, when the first terminal apparatus is not capable of receiving the first file; and
   converting the first file into the first format usable by the first terminal apparatus, when the load amount of the server apparatus is within the reference.

2. The file synchronization method according to claim 1, comprising:
   storing the first converted file that is converted into the first format when the first terminal apparatus is not capable of receiving the first file; and
   transmitting the first converted file, converted into the first format and stored, to the first terminal apparatus, when the first terminal apparatus becomes capable of receiving the first converted file.

3. The file synchronization method according to claim 1, comprising:

prohibiting a conversion of the first file into the first format usable by the first terminal apparatus, when the load amount of the server apparatus exceeds the reference.

4. The file synchronization method according to claim 1, comprising:
managing a priority order of a plurality of terminal apparatuses,
wherein the first terminal apparatus is selected from the plurality of terminal apparatuses based on the priority order.

5. The file synchronization method according to claim 1, further comprising:
when the first format and the second format are determined to be the same and the first converted file and the second converted file are determined to be the same in response to the synchronization request, storing the first converted file as the second converted file in the memory in association with identification information of the second file for the second terminal apparatus and the second format usable by the second terminal apparatus.

6. A server apparatus comprising:
a memory; and
at least one processor coupled to the memory and configured to:
determine whether a first terminal apparatus is capable of receiving a first file in response to a synchronization request for the first file;
convert the first file into a first format usable by the first terminal apparatus to acquire a first converted file, when the first terminal apparatus is capable of receiving the first file;
store, in the memory, information relating to the first terminal apparatus, identification information for identifying the first file, the first format, and the first converted file converted into the first format, in association with a user of the first terminal apparatus;
determine, when a second file for a second terminal apparatus is to be converted into a second format, as a second converted file, usable by the second terminal in response to the synchronization request, whether the second converted file converted into the second format usable by the second terminal apparatus is included in the memory;
store, when the second converted file is included in the memory, identification information of the second file for the second terminal apparatus and the second format usable by the second terminal apparatus in the memory in association with the second converted file;
transmit the stored second converted file to the second terminal apparatus;
determine whether a load amount of a server apparatus that converts the first file into the first format is within a reference, when the first terminal apparatus is not capable of receiving the first file; and
convert the first file into the first format usable by the first terminal apparatus, when the load amount of the server apparatus is within the reference.

7. The server apparatus according to claim 6, wherein the processor is further configured to:
store the first converted file that is converted into the first format when the first terminal apparatus is not capable of receiving the first file; and
transmit the first converted file, converted into the first format and stored, to the first terminal apparatus, when the first terminal apparatus becomes capable of receiving the first converted file.

8. The server apparatus according to claim 6, wherein the processor is further configured to:
prohibit a conversion of the first file into the first format usable by the first terminal apparatus, when the load amount of the server apparatus exceeds the reference.

9. The server apparatus according to claim 6, wherein, the processor is further configured to:
manage a priority order of a plurality of terminal apparatuses,
wherein the first terminal apparatus is one selected from the plurality of terminal apparatuses based on the priority order.

10. The server apparatus according to claim 6, wherein the processor is further configured to:
when the first format and the second format are determined to be the same and the first converted file and the second converted file are determined to be the same in response to the synchronization request, store the first converted file as the second converted file in the memory in association with identification information of the second file for the second terminal apparatus and the second format usable by the second terminal apparatus.

11. A file synchronization method comprising:
determining whether a terminal apparatus is capable of receiving a file in response to a synchronization request for the file;
determining whether an amount of load of a server apparatus that converts the file into a format is within a reference, when the terminal apparatus is not capable of receiving the file; and
prohibiting a conversion of the file into the format usable by the terminal apparatus, when the amount of load of the server apparatus exceeds the reference.

12. The file synchronization method according to claim 11, comprising:
converting the file into the format usable by the terminal apparatus, when the amount of load of the server apparatus is within the reference; and
storing the file that is converted into the format when the terminal apparatus is not capable of receiving the file is determined by the determining.

13. The file synchronization method according to claim 11, further comprising:
transmitting the file, converted into the format and stored, to the terminal apparatus, when the terminal apparatus becomes capable of receiving the file.

* * * * *